US012609440B2

(12) United States Patent
Li et al.

(10) Patent No.: US 12,609,440 B2
(45) Date of Patent: Apr. 21, 2026

(54) MOUNTING SYSTEMS FOR BASE STATION ANTENNAS

(71) Applicant: Outdoor Wireless Networks LLC, Claremont, NC (US)

(72) Inventors: Xiang Li, Shanghai (CN); YongJie Xu, Shanghai (CN); Ligang Wu, Suzhou (CN); XiaoHua Hou, Richardson, TX (US); Qiyun Gu, Shanghai (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 240 days.

(21) Appl. No.: 18/475,756

(22) Filed: Sep. 27, 2023

(65) Prior Publication Data

US 2024/0113419 A1 Apr. 4, 2024

Related U.S. Application Data

(60) Provisional application No. 63/377,749, filed on Sep. 30, 2022.

(51) Int. Cl.
*H01Q 1/24* (2006.01)

(52) U.S. Cl.
CPC .................................. *H01Q 1/246* (2013.01)

(58) Field of Classification Search
CPC ....... H01Q 1/246; H01Q 1/125; H01Q 1/1228
See application file for complete search history.

(56) References Cited

U.S. PATENT DOCUMENTS

| | | | | |
|---|---|---|---|---|
| 2014/0179244 A1* | 6/2014 | Colapietro | H01Q 1/246 455/90.2 |
| 2014/0315408 A1* | 10/2014 | Colapietro | H01Q 1/246 439/247 |
| 2021/0305684 A1* | 9/2021 | Hou | H01Q 15/23 |
| 2021/0367320 A1* | 11/2021 | Wang | H01Q 1/1264 |
| 2022/0328949 A1* | 10/2022 | Han | H01Q 1/1242 |
| 2024/0113419 A1* | 4/2024 | Li | H01Q 1/246 |

* cited by examiner

*Primary Examiner* — Hai V Tran

(74) *Attorney, Agent, or Firm* — Myers Bigel, P.A.

(57) ABSTRACT

The present application is directed to a mounting system for a base station antenna. The system includes a passive antenna and an active antenna module and a mounting kit. The mounting kit includes an upper radio mounting bracket assembly and a lower radio mounting bracket assembly, and is configured to mount and secure an upper portion of the passive antenna to a mounting structure and mount and secure the active antenna module to the mounting structure behind the passive antenna. The system further includes a middle antenna mounting bracket assembly configured to pivotably mount a middle portion of the passive antenna to the mounting structure and a lower antenna mounting bracket assembly configured to slidably and/or pivotably mount a lower portion of the passive antenna to the mounting structure. The mounting system is configured to adjust the base station antenna downwardly or upwardly to a desired angle of tilt. Mounting kits and methods of operating same are also described herein.

19 Claims, 20 Drawing Sheets

MOUNTING SYSTEMS FOR BASE STATION ANTENNAS

RELATED APPLICATION(S)

The present application claims priority from and the benefit of U.S. Provisional Patent Application Ser. No. 63/377,749, filed Sep. 30, 2022, the disclosure of which is hereby incorporated herein in its entirety.

FIELD

The present invention relates to telecommunications equipment, and in particular, to mounting systems for base station antennas.

BACKGROUND

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements. The radios for these beamforming arrays may be integrated into the antenna so that the antenna may perform active beamforming (i.e., the shapes of the antenna beams generated by the antenna may be adaptively changed to improve the performance of the antenna). These beamforming arrays typically operate in higher frequency bands, such as various portions of the 3.3-5.8 GHz frequency band. Antennas having integrated radios that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

FIGS. 1A-1B illustrate an example of a prior art mounting system 10 for an "active" base station antenna 80, i.e., a passive antenna 60 and an active antenna module (or radio) 70. The mounting system 10 includes a plurality of mounting brackets 30 (e.g., an upper mounting bracket 32, a middle mounting bracket 34, and a lower mounting bracket 36) that help secure the base station antenna 80 to a mounting structure 50 (e.g., a mounting pole P). The mounting system 10 further includes a frame (or mounting) kit 20 having a base frame 25 and one or more securing brackets 22, 24 that affix the radio 70 to the rear of the antenna 60. While the mounting system 10 shown in FIGS. 1A-1B may help to simplify radio installation, it has some disadvantages. For example, the weight of the mounting system 10 (in particular, the mounting kit 20) is too heavy, the overall cost of the mounting system 10 is relatively expensive, it difficult for a technician to tilt the base station antenna 80 without having to perform multiple steps, and all of the load weight of the module or radio 70 is transferred to the mounting kit 20 and antenna 60. Thus, alternative mounting systems for base station antennas may be desired.

SUMMARY

A first aspect of the present invention is directed to a mounting system for a base station antenna. The system includes a passive antenna and an active antenna module and a mounting kit. The mounting kit includes an upper radio mounting bracket assembly and a lower radio mounting bracket assembly, the mounting kit being configured to mount and secure an upper portion of the passive antenna to a mounting structure and mount and secure the active antenna module to the mounting structure behind the passive antenna. The system further includes a middle antenna mounting bracket assembly configured to pivotably mount a middle portion of the passive antenna to the mounting structure and a lower antenna mounting bracket assembly configured to slidably and/or pivotably mount a lower portion of the passive antenna to the mounting structure. The mounting system is configured to adjust the base station antenna downwardly or upwardly to a desired angle of tilt.

Another aspect of the present invention is directed to a mounting kit for a base station antenna. The mounting kit includes an upper radio mounting bracket assembly and a lower radio mounting bracket assembly. The upper bracket assembly includes a main body having two opposing side walls that are coupled to and extend downwardly therefrom, a first elongated slot residing within each of the sidewalls, a rack and pinion assembly coupled to one of the sidewalls, and a brake slider. The pinion of the rack and pinion assembly is secured by a first fastener extending through the first elongated slot and configured to rotate relative to the sidewall such that the pinion can travel back-and-forth along the rack as the first fastener slides within the elongated slot to adjust the base station antenna to the desired angle of tilt. The brake slider is configured to engage the pinion to lock the rack and pinion assembly in position after the desired angle of tilt has been achieved. The lower bracket assembly includes a main body having two opposing sidewalls that are coupled to and extend downwardly therefrom and a second elongated slot configured to receive a second fastener for mounting and securing the lower radio mounting bracket assembly to a corresponding pipe clamp. The second fastener is configured to slide within the second elongated slot as the angle of tilt for the base station antenna is being adjusted.

Another aspect of the present invention is directed to a mounting bracket assembly for a base station antenna. The mounting bracket assembly includes a main body having two opposing sidewalls that are coupled to and extend downwardly therefrom, an elongated slot residing within each of the sidewalls, a rack and pinion assembly coupled to one of the sidewalls, and a brake slider. The pinion of the rack and pinion assembly is secured by a fastener extending through the elongated slot and configured to rotate relative to the sidewall such that the pinion can travel back-and-forth along the rack as the fastener slides within the elongated slot to adjust the base station antenna to a desired angle of tilt. The brake slider is configured to engage the pinion to lock the rack and pinion assembly in position after the desired angle of tilt for the base station antenna has been achieved.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 12A illustrates the mounting system providing an upward tilt to the base station antenna. FIG. 12B illustrates the mounting system providing zero tilt to the base station antenna. FIG. 12C illustrates the mounting system providing a downward tilt to the base station antenna.

DETAILED DESCRIPTION

Figure 1A:
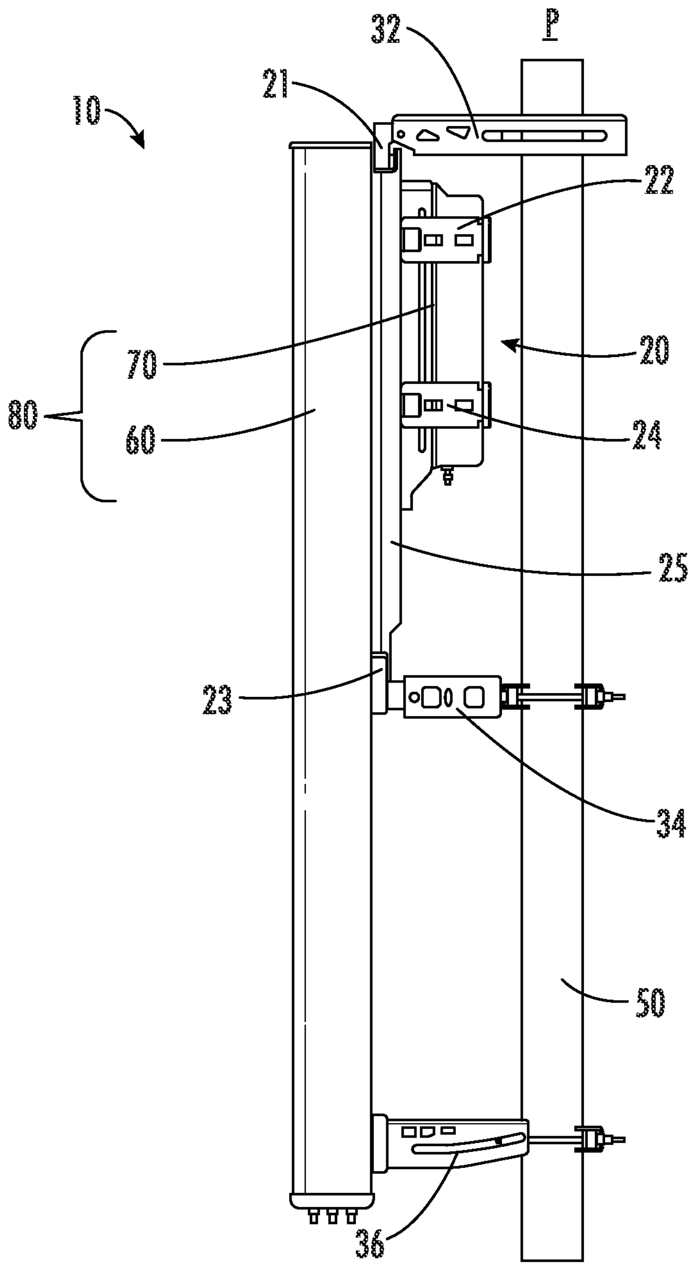
FIG. 1A (PRIOR ART)
FIG. 1A is a side view of a known mounting system for a base station antenna.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

In the description that follows, a base station antenna 80 will be described using terms that assume that the base station antenna 80 is mounted for use on a tower, pole or other mounting structure 50 with a longitudinal axis of the antenna 60 extending along a vertical axis and the front of the base station antenna 80 mounted opposite the tower, pole or other mounting structure 50 pointing toward the target coverage area for the base station antenna 80 and the rear of the base station antenna 80 facing the tower or other mounting structure 50. It will be appreciated that the base station antenna 80 may not always be mounted so that the longitudinal axis thereof extends along a vertical axis. For example, the base station antenna 80 may be tilted slightly (e.g., less than 10°) with respect to the vertical axis so that the resultant antenna beams formed by the base station antenna 80 each have a small mechanical downtilt or uptilt.

Figure 2:
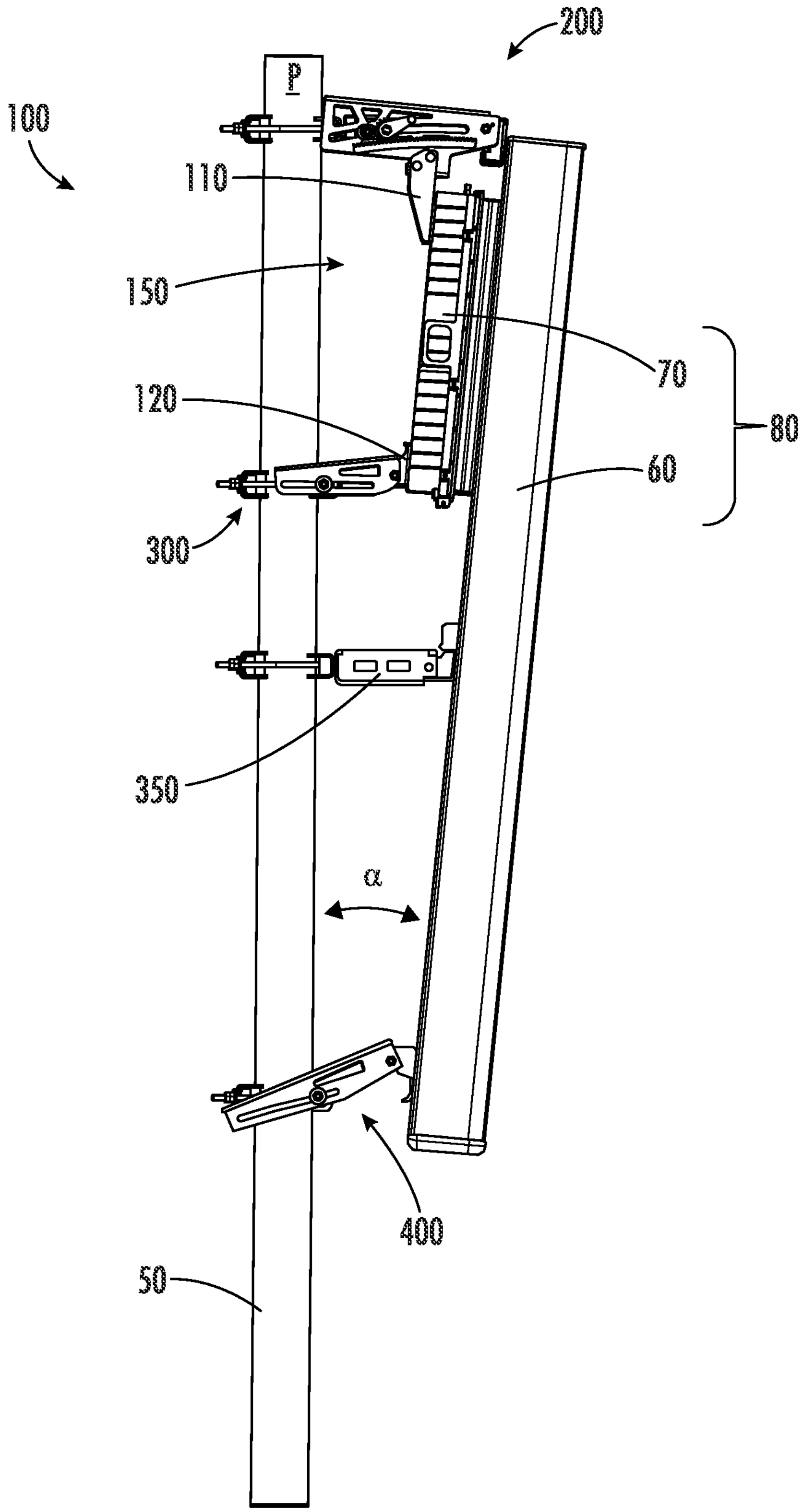
FIG. 2 is a side view of a mounting system for a base station antenna according to embodiments of the present invention.

Referring to FIG. 2, an example mounting system 100 according to embodiments of the present invention is illustrated. The mounting system 100 may be used for mounting an active antenna module (or radio) 70 of a base station antenna 80 behind a passive antenna 60. The system 100 is configured to mount the active base station antenna 80 (i.e., passive antenna 60 and active antenna module 70) to a mounting structure 50 (e.g., a mounting pole P). After secured to the mounting structure 50, the mounting system 100 may be configured to tilt the base station antenna 80 upwardly or downwardly to a desired angle of tilt ($\alpha$) (see, e.g., FIGS. 12A-12C). In some embodiments, the mounting system 100 may be configured to tilt the base station antenna 80 at an angle of tilt ($\alpha$) in a range of about −4 degrees to about +8 degrees.

As used herein, the term "active antenna module" is used interchangeably with "active antenna unit," "AAU," and "radio" and refers to a cellular communications unit comprising radio circuitry and associated antenna elements that are capable of electronically adjusting the amplitude and/or phase of the subcomponents of an RF signal that are output to different radiating elements of an array or groups thereof. The active antenna module 70 comprises the radio circuitry and the radiating elements (e.g., a multi-input-multi-output (mMIMO) beamforming antenna array) and may include other components such as filters, a calibration network, antenna interface signal group (AISG) controller and the like. The active antenna module 70 can be provided as a single integrated unit or provided as a plurality of stackable units, including, for example, first and second sub-units such as a radio sub-unit (box) with the radio circuitry and an antenna sub-unit (box) with a multi-column array of radiating elements and the first and second sub-units stackably attach together in a front-to-back direction of the base station antenna 80, with the antenna unit closer to a front (external radome) of the base station antenna 80 than the radio unit.

As used herein, the term "passive antenna assembly" refers to an antenna assembly having arrays of radiating elements that are coupled to radios that are external to the antenna, typically remote radio heads that are mounted in close proximity to the antenna 60 (or housing thereof). The arrays of radiating elements included in the passive antenna assembly are configured to form static antenna beams. The passive antenna assembly can comprise radiating elements such as one or both low-band radiating elements and/or mid-band or high band radiating elements. The passive antenna assembly is mounted in the housing of the antenna 60 and the antenna housing can releasably (detachably) couple (e.g., directly or indirectly attach) to one or more active antenna modules 70 that is/are separate from the passive antenna assembly.

The arrays of radiating elements included in the passive antenna assembly are configured to form static antenna beams (e.g., antenna beams that are each configured to cover a sector of a base station). The passive antenna assembly may comprise a backplane provided by a reflector, with radiating elements projecting in front of the reflector and the radiating elements can include one or more linear arrays of low-band radiating elements that operate in all or part of the 617-960 MHz frequency band and/or one or more linear arrays of mid-band radiating elements that operate in all or part of the 1427-2690 MHz frequency band. The passive antenna assembly is mounted in the housing of the antenna 60 and one or more active antenna modules or radios 70 can releasably (detachably) couple (e.g., directly or indirectly attach) to a back of the antenna housing.

Figure 1B:
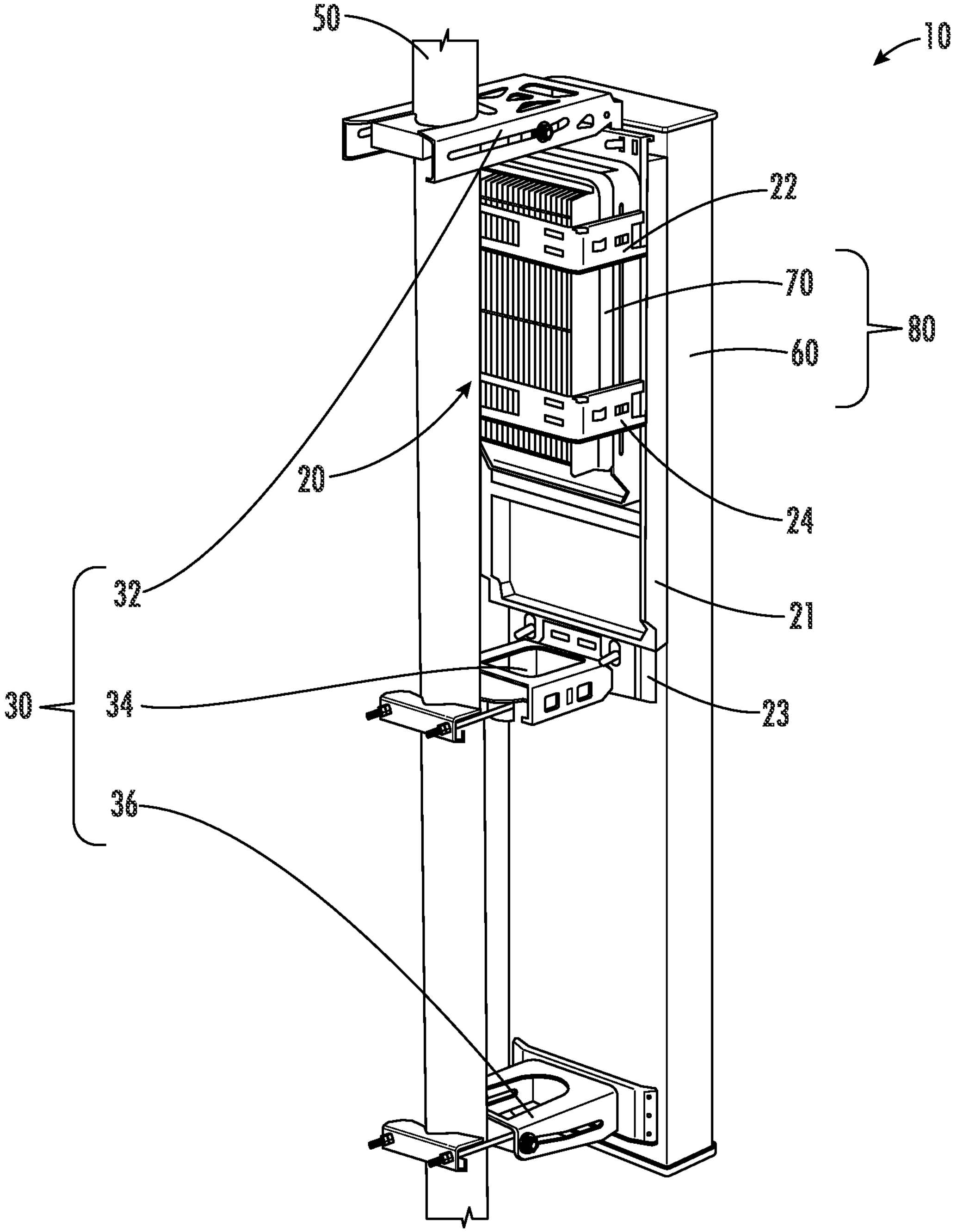
FIG. 1B (PRIOR ART)
FIG. 1B is a rear perspective view of the mounting system of FIG. 1A.
Figure 3A:
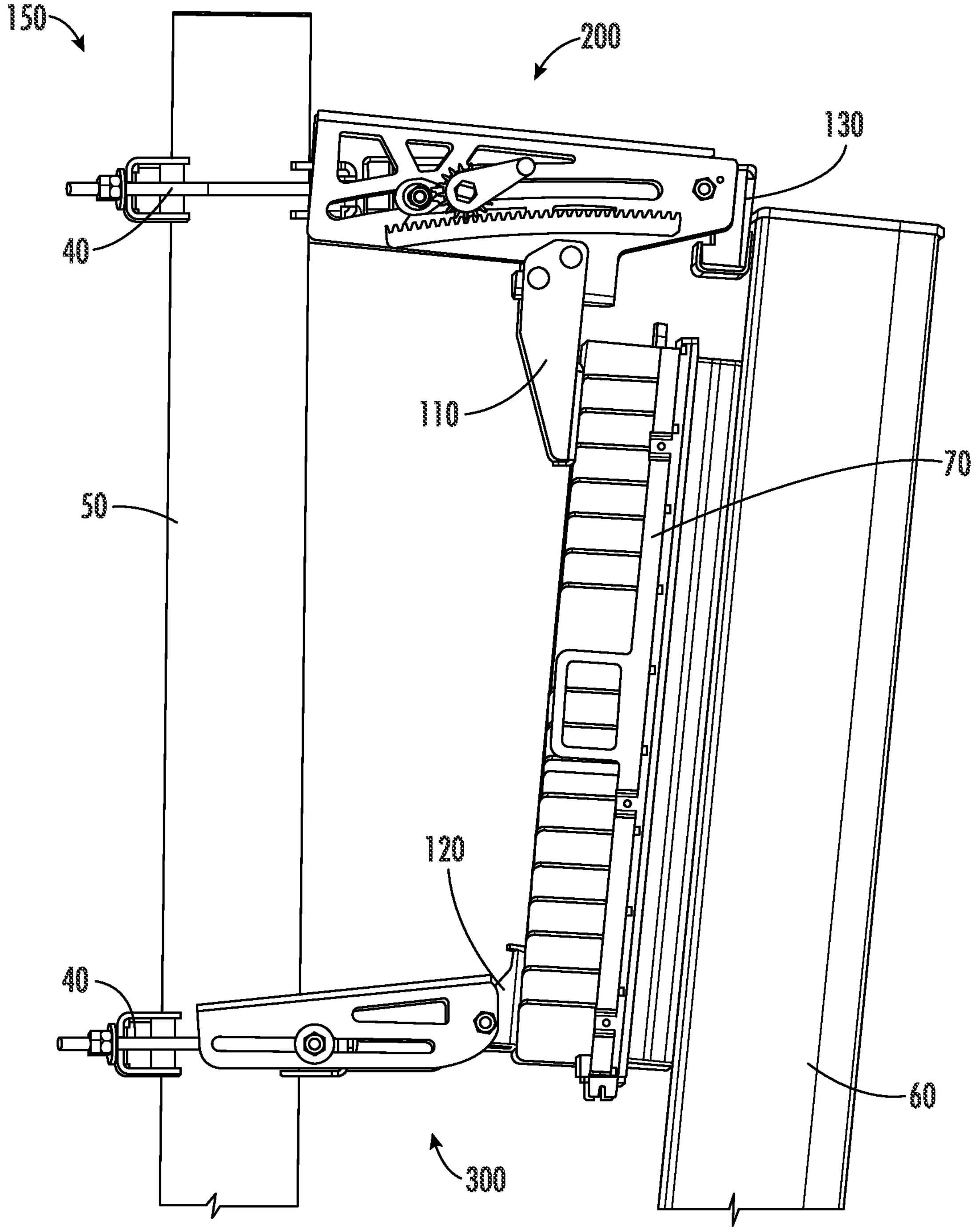
FIG. 3A is an enlarged side view of a mounting kit of the mounting system of FIG. 2 according to embodiments of the present invention.
Figure 3B:
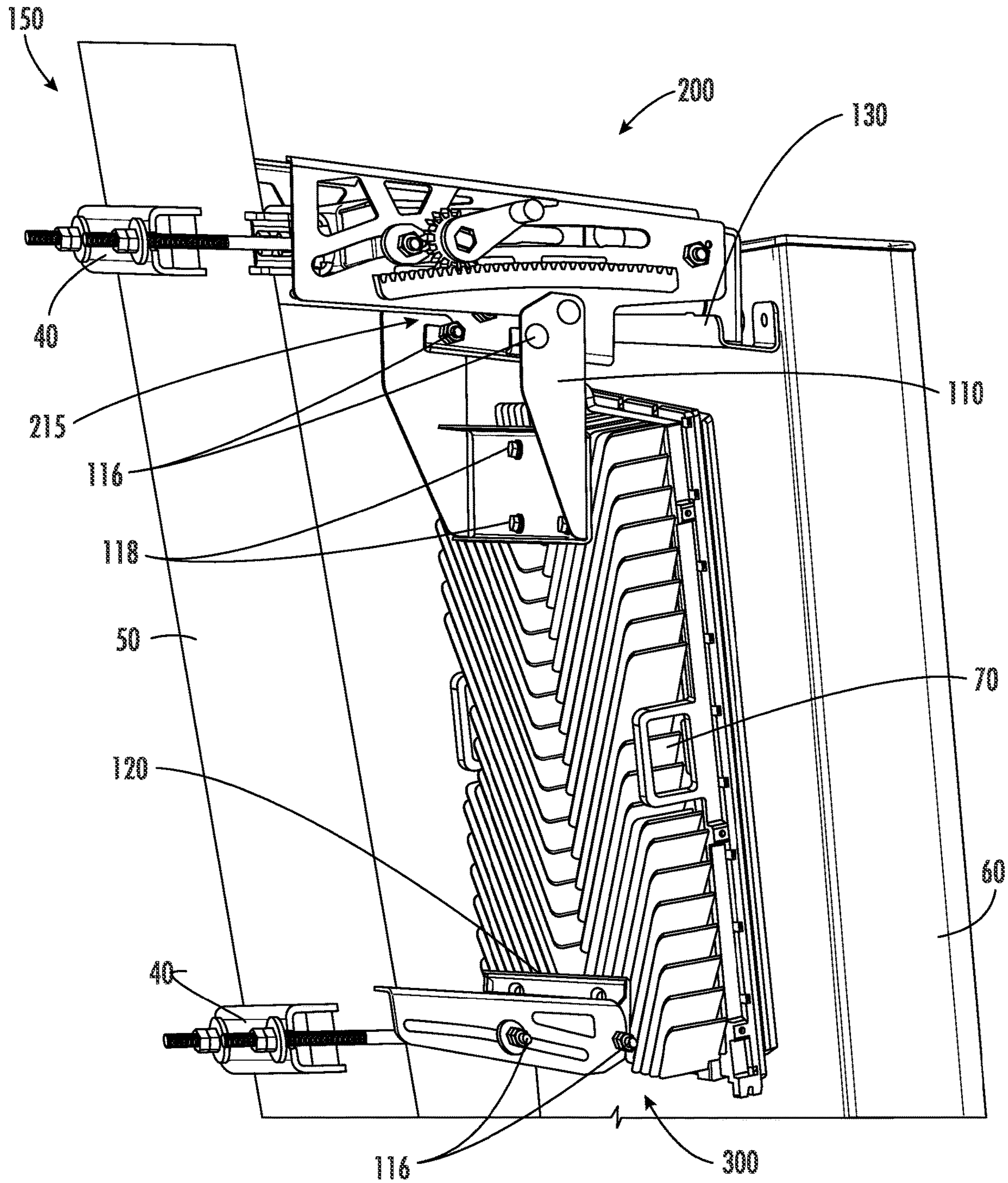
FIG. 3B is an enlarged rear perspective view of the mounting kit of FIG. 3A.

Still referring to FIG. 2, in some embodiments, the mounting system 100 of the present invention includes a mounting kit 150 (see also FIGS. 3A-3B). In some embodiments, the mounting kit 150 includes an upper radio mounting bracket assembly 200 and a lower radio mounting bracket assembly 300. In some embodiments, the mounting system 100 further includes a middle antenna mounting bracket assembly 350 and a lower antenna mounting bracket assembly 400. In some embodiments, the middle antenna mounting bracket assembly 350 is similar to the middle mounting bracket 34 used in current mounting systems such as the mounting system 10 shown in FIGS. 1A-1B. Standard pipe clamps 40 may be used to mount and secure the respective mounting bracket assemblies 200, 300, 350, 400 to a mounting structure 50.

Figure 4:
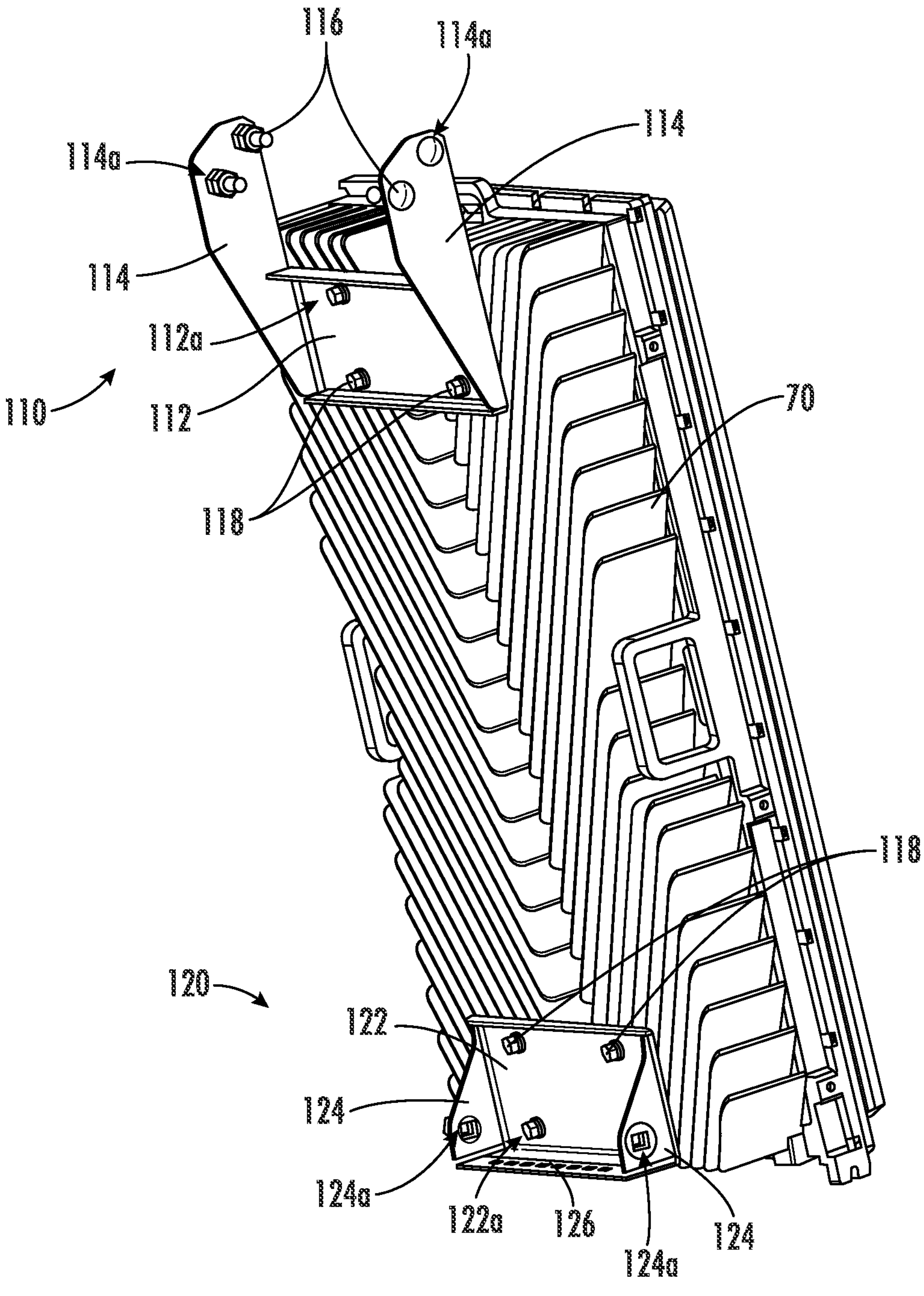
FIG. 4 is a rear perspective view of the upper and lower mounting brackets of the mounting kit of FIG. 3A mounted to an active antenna module according to embodiments of the present invention.

Referring to FIGS. 3A-3B and FIG. 4, in some embodiments, an upper radio mounting bracket 110 and a lower radio mounting bracket 120 may be used to secure and mount the active antenna module or radio 70 to the upper radio mounting bracket assembly 200 and the lower radio mounting bracket assembly 300, respectively. In some embodiments, the upper and lower radio mounting brackets 110, 120 are configured such that the radio 70 is removable (detachable) from the mounting system 100 without also having to remove the corresponding antenna 60 (see, e.g., FIGS. 16A-16C). In addition, as shown in FIGS. 3A-3B, the upper radio mounting bracket assembly 200 may further include an upper antenna mounting bracket 130 configured to mount and secure the antenna 60 to the upper radio mounting bracket assembly 200.

As shown in FIG. 4, in some embodiments, the upper radio mounting bracket 110 includes a main body 112 and two opposing arm members 114 that are coupled to and extend upwardly from the main body 112. The main body 112 comprises a plurality of apertures **112*a*. Each aperture 112*a* is configured to receive a respective fastener 118 to secure the upper radio mounting bracket 110 to the radio 70. For example, each aperture 112*a* aligns with a corresponding aperture (not shown) in the radio 70 such that the upper radio mounting bracket 110 may be mounted and secured to the radio 70 via the fasteners 118. Each arm member 114 also includes a pair of apertures 114*a* that are configured to receive a respective fastener 116 for mounting and securing the upper radio mounting bracket 110 (and radio 70 attached thereto) to the upper radio mounting bracket assembly 200**. This will be discussed in further detail below.

It is noted that the fasteners described herein (e.g., fasteners 116 and 118) may comprise bolts, screws, nuts, washers or the like. An exemplary fastener 116 (comprising a bolt **116*a* and nuts 116*b*) that may be used with any of the mounting brackets and/or mounting bracket assemblies described herein is illustrated in FIG. 15**B.

Figure 14A:
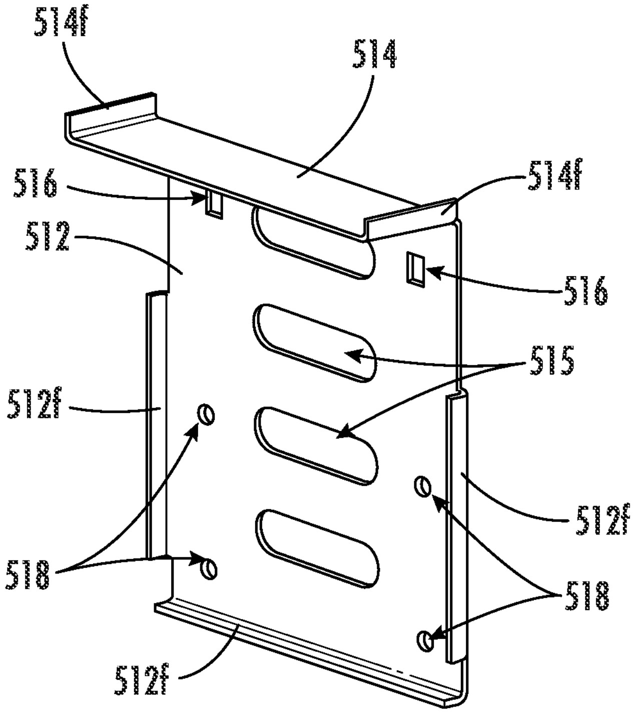
FIG. 14A is a perspective view of an upper mounting bracket of the alternative mounting kit utilized in the mounting system of FIG. 13A.
Figure 14B:
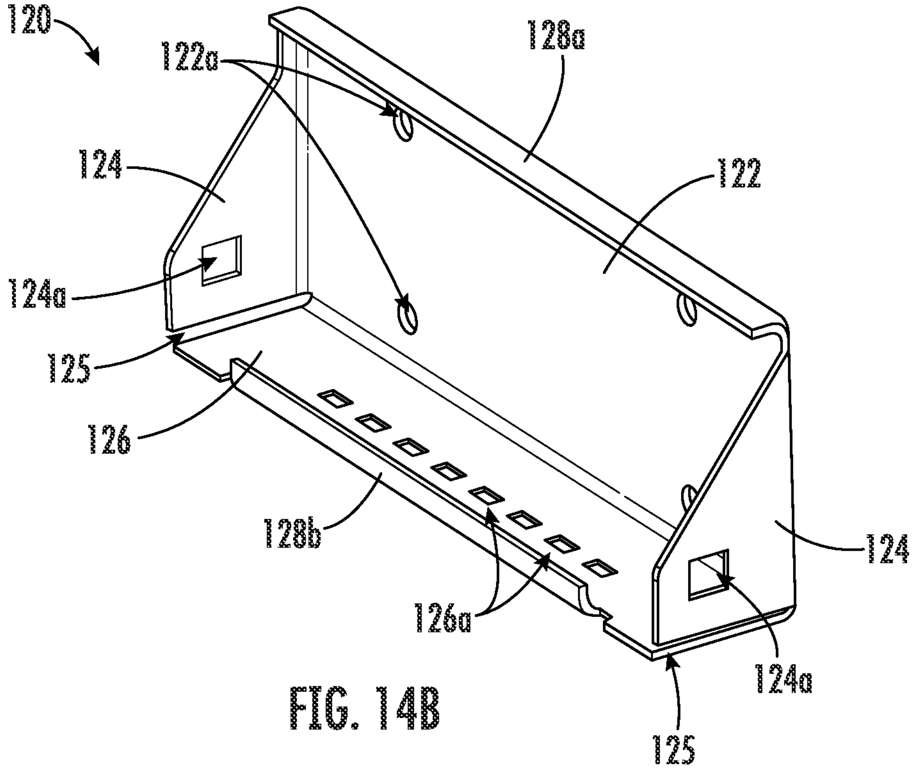
FIG. 14B is a perspective view of a lower mounting bracket of the alternative mounting kit which is similar to the lower mounting bracket for the mounting kit shown in FIG. 4.

Still referring to FIG. 4, in some embodiments, the lower radio mounting bracket 120 includes a main body 122 and two opposing sidewalls 124 that are coupled to and extend outwardly from the main body 122 (see also FIG. 14B). The main body 122 includes a plurality of apertures **122*a*. Each aperture 122*a* is configured to receive a respective fastener 118. Similar to the apertures 112*a* in the upper radio mounting bracket 110, each aperture 122*a* in the lower radio mounting bracket 120 is configured to align with a corresponding aperture (not shown) in the radio 70 such that the lower radio mounting bracket 120 may be mounted and secured to the radio 70. The opposing sidewalls 124 of the lower radio mounting bracket 120 also each have an aperture 124*a* configured to receive a respective fastener 116 for mounting and securing the lower radio mounting bracket 120 (and radio 70) to the lower radio mounting bracket assembly 300. In some embodiments, a third wall (or flanged edge) 126 may extend outwardly from a bottom edge of the main body 122 of the lower radio mounting bracket 120. The third wall 126 may provide additional structural support to the mounting bracket 120 and radio 70 secured thereto. It is noted that the upper and lower radio mounting brackets 110, 120 may be designed/modified to accommodate different types of radios 70, for example, changing the size of the brackets 110, 120 and/or placement of the respective apertures 112*a*, 122*a***.

Figure 5:
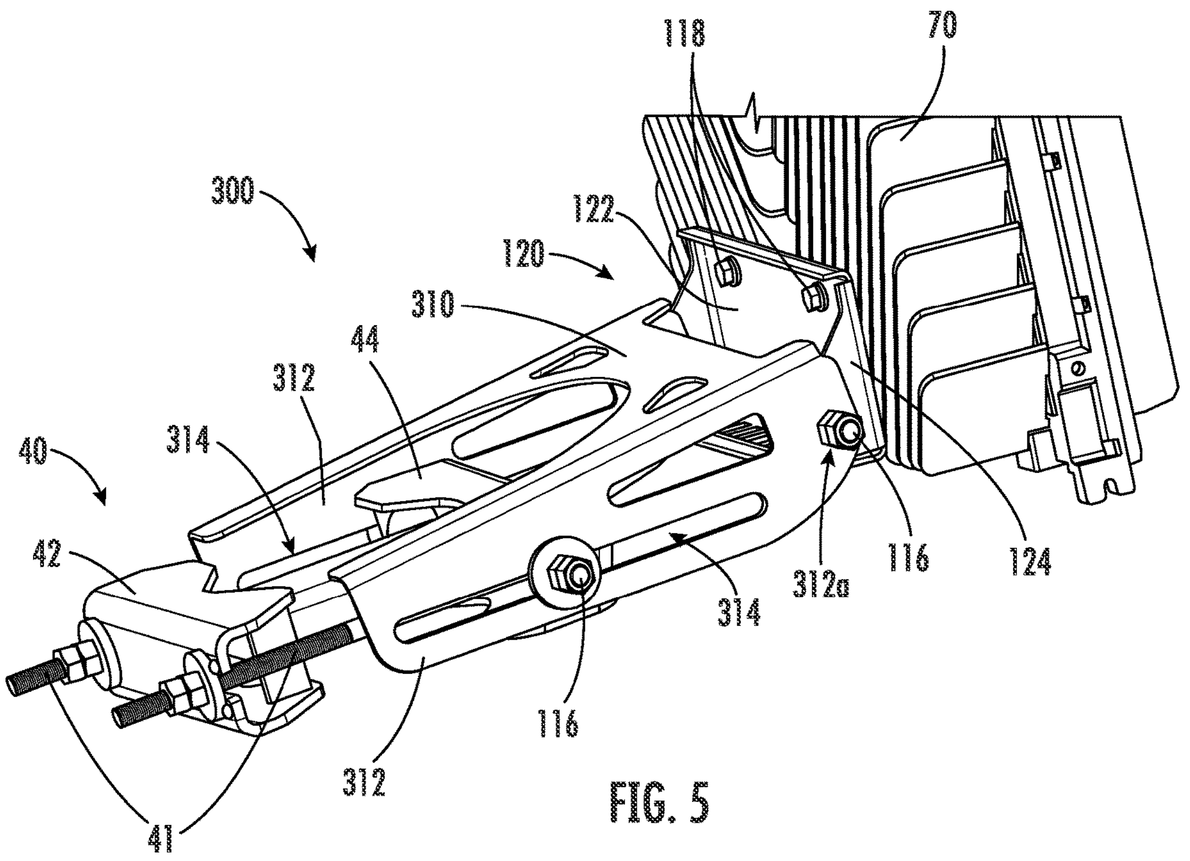
FIG. 5 is an enlarged top perspective view of a lower radio mounting bracket assembly of the mounting kit of FIG. 3A according to embodiments of the present invention.

The lower radio mounting bracket assembly 300 according to embodiments of the present invention is illustrated in FIG. 5. As shown in FIG. 5, in some embodiments, the lower radio mounting bracket assembly 300 has a main body 310 having two opposing sidewalls 312 that are coupled to and extend downwardly therefrom. Each sidewall 312 comprises an aperture **312*a* that aligns with the corresponding apertures 124*a* in the sidewalls 124 of the lower radio mounting bracket 120. The aligned apertures 312*a*, 124*a* are configured to receive a fastener 116 such that the lower radio mounting bracket 120 may be pivotably mounted and secured to the lower radio mounting bracket assembly 300. Each sidewall 312 of the bracket assembly 300 further comprises an elongated adjustment slot 314. The elongated slot 314 is configured to receive a second fastener 116 for mounting and securing the bracket assembly 300 to a corresponding pipe clamp 40**.

Figure 6:
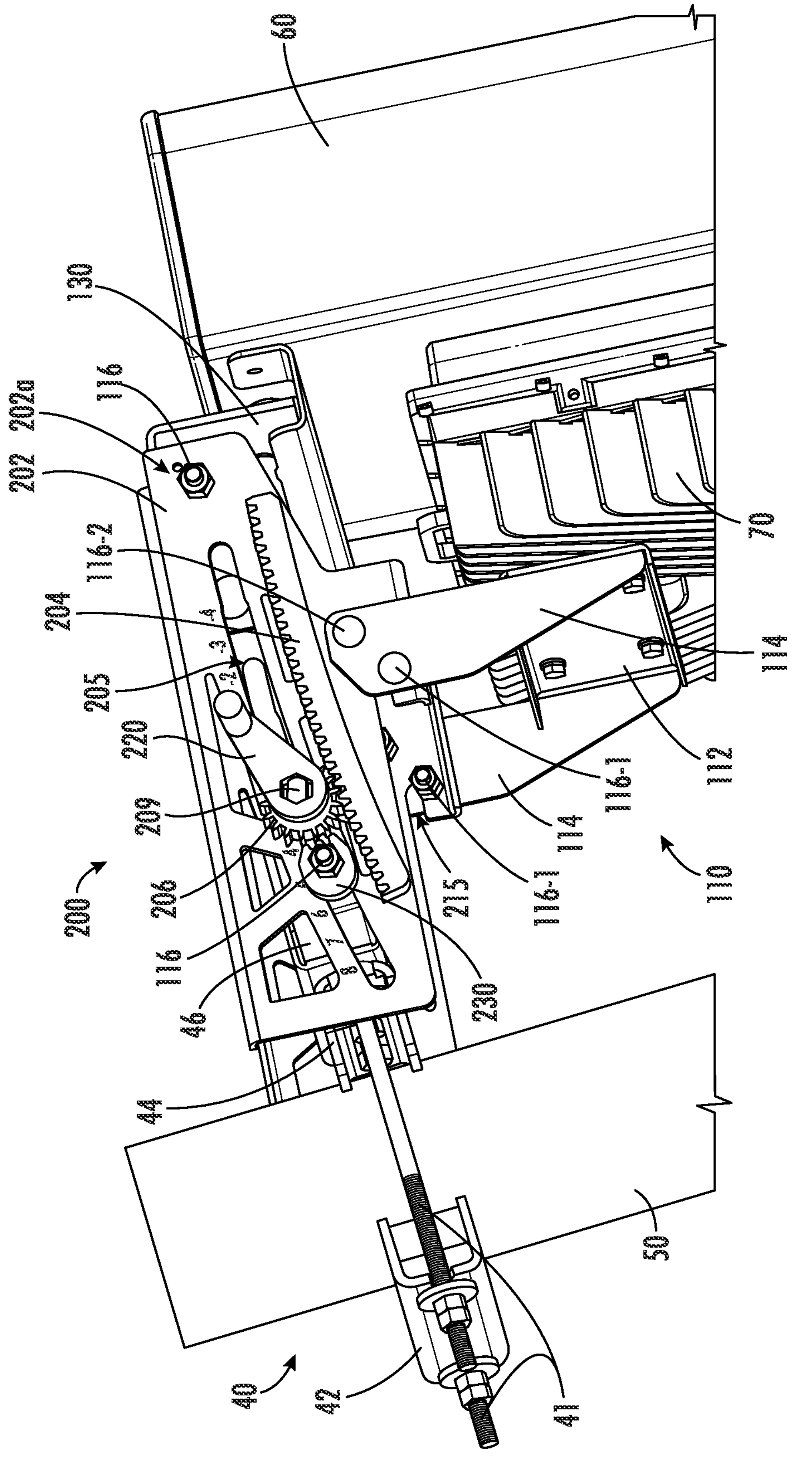
FIG. 6 is an enlarged bottom perspective view of an upper radio mounting bracket assembly of the mounting kit of FIG. 3A according to embodiments of the present invention.
Figure 11A:
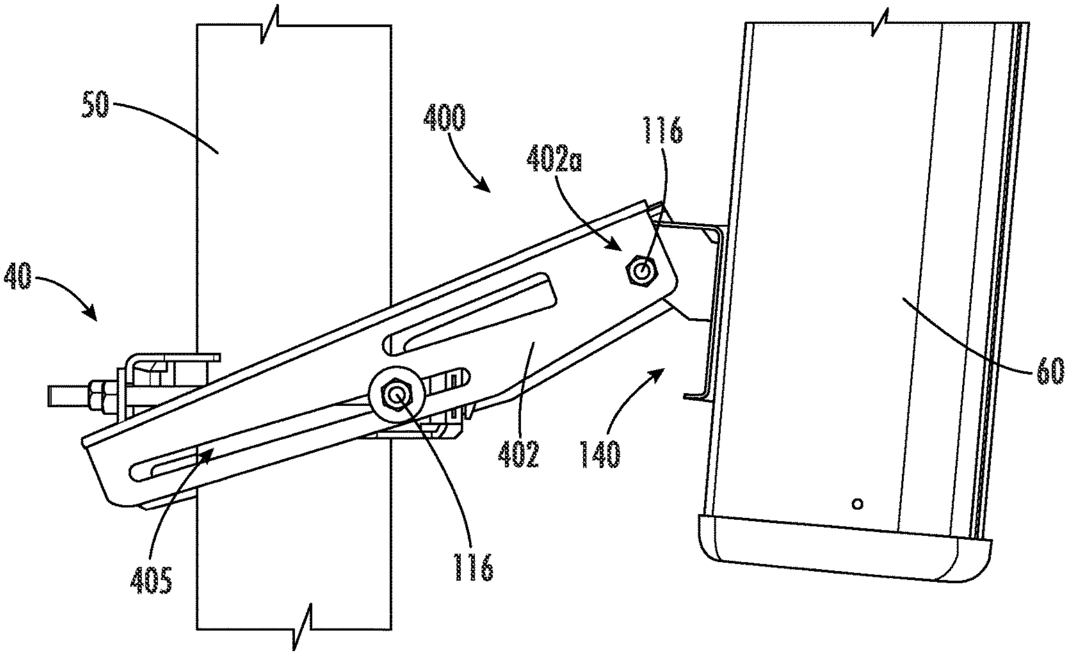
FIG. 11A is a side view of a lower antenna mounting bracket assembly of the mounting system of FIG. 2 according to embodiments of the present invention.
Figure 11B:
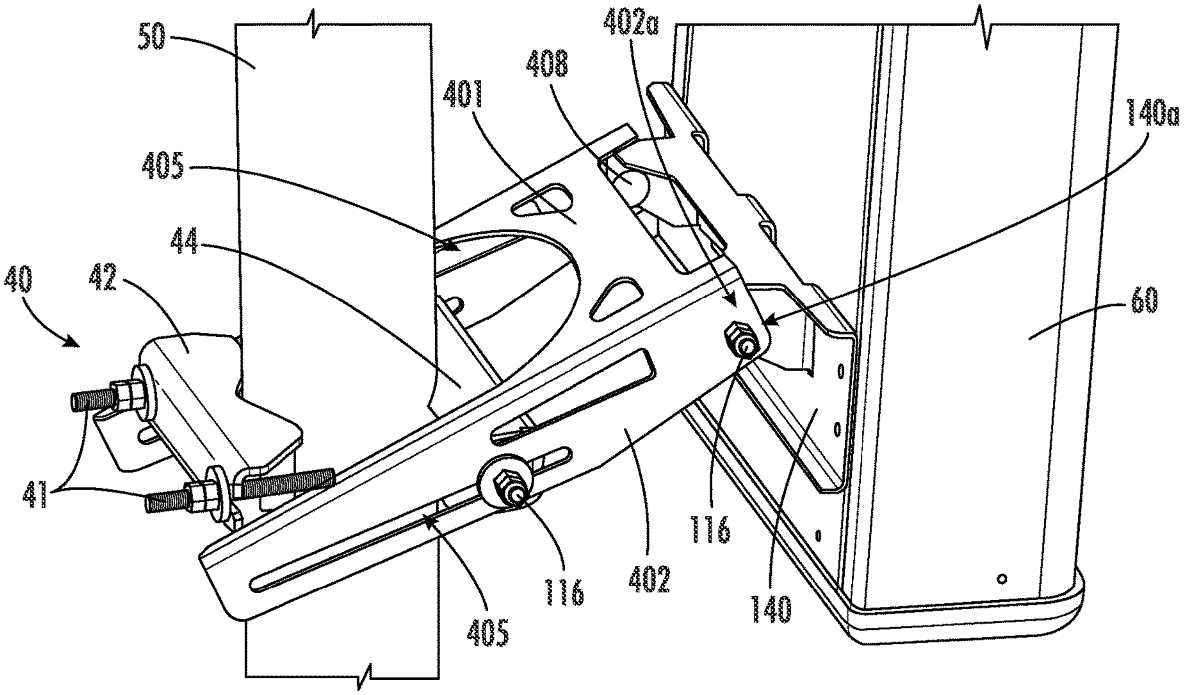
FIG. 11B is a top perspective view of the lower antenna mounting bracket assembly of FIG. 11A.

As shown in FIG. 5, each pipe clamp 40 may comprise a pair of clamping members 42, 44 and a pair of fasteners 41 (e.g., threaded rod or bolt) (see also FIG. 6 and FIG. 11B). These are standard pipe clamps 40 such that when the fasteners 41 are tightened, the clamping members 42, 44 are drawn toward each other to engage and secure the mounting structure 50 therebetween (see, e.g., FIGS. 3A-3B). In some embodiments, one of the clamping members 44 may be configured to receive the second fastener 116 (i.e., the fastener 116 received through the elongated slot 314 of the bracket assembly 300) to secure the bracket assembly 300 to the clamping member 44 (and pipe clamp 40). In other embodiments, an extension member 46 may be coupled to the clamping member 44 and configured to receive the second fastener 116 (see, e.g., FIG. 6). As discussed in further detail below, the second fastener 116 is configured to slide and/or pivot within the elongated slot 314 which allows the bracket assembly 300 to move relative to the pipe clamp 40 (and mounting structure 50) as the angle of tilt (α) of the mounting system 100 is adjusted. In addition, the second fastener 116 allows the bracket assembly 300 to be moved (i.e., relative to the mounting structure 50) to provide additional space between the mounting structure 50 and the antenna 60, which helps allow for easy mounting of the radio 70 to the mounting structure 50.

Figure 7A:
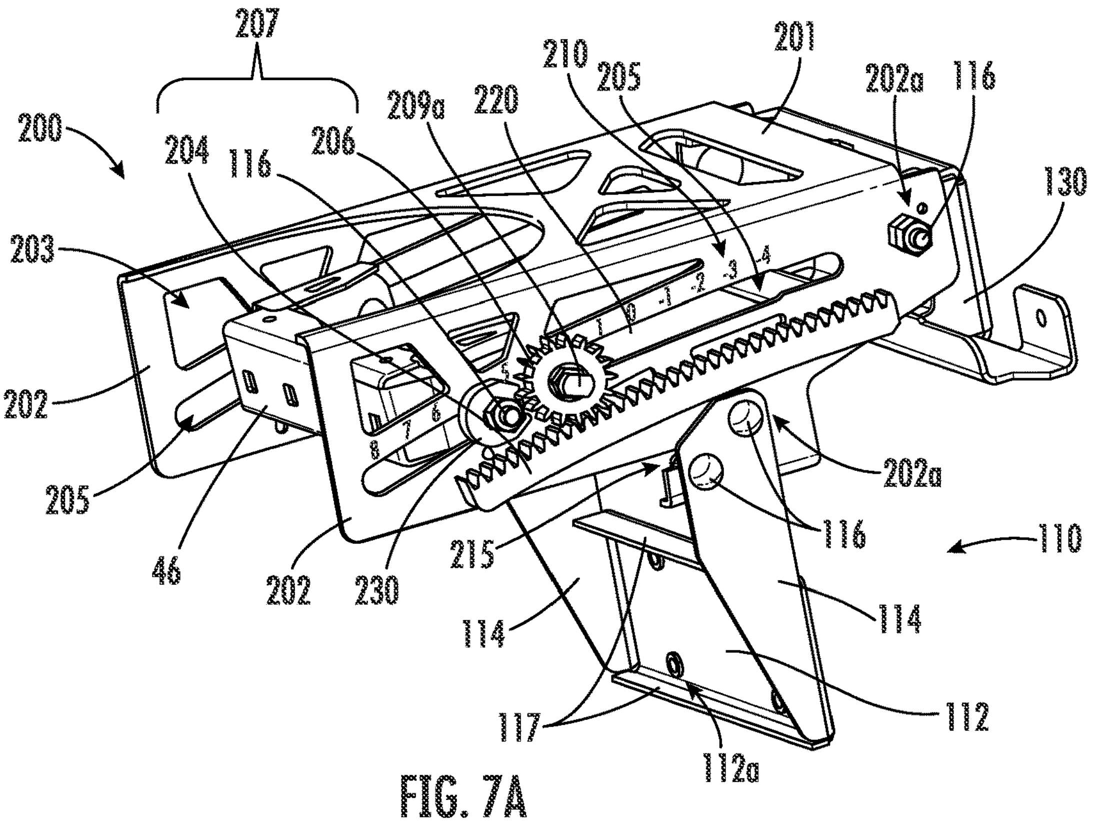
FIG. 7A is a perspective view of the upper radio mounting bracket assembly of FIG. 6 according to embodiments of the present invention.
Figure 7B:
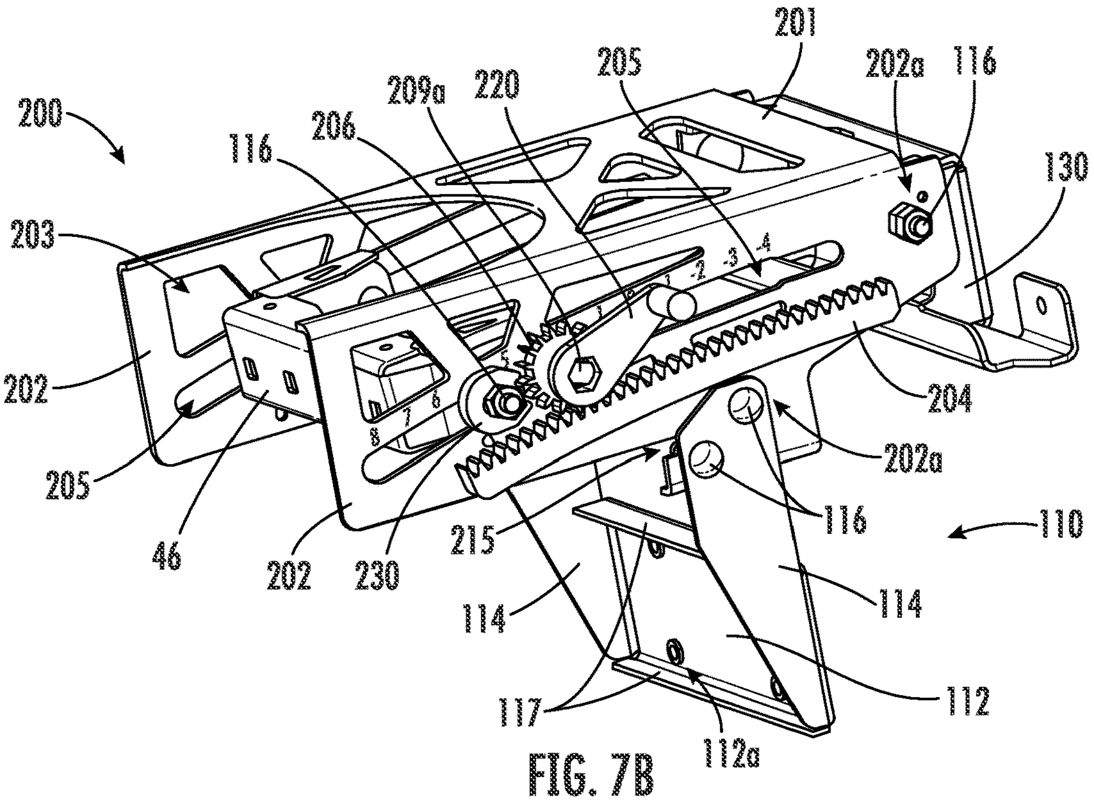
FIG. 7B is a perspective view of the upper radio mounting bracket assembly of FIG. 7A according to embodiments of the present invention illustrating placement of an exemplary wrench that may be used to adjust the upper radio mounting bracket assembly to adjust the tilt of a corresponding base station antenna.

FIG. 6 and FIGS. 7A-7B illustrate the upper radio mounting bracket assembly 200 according to embodiments of the present invention. As shown in FIG. 6, one end of the assembly 200 is configured to be secured to the mounting structure 50 (e.g., via a pipe clamp 40). As noted above, in some embodiments, the assembly 200 may comprise an extension member 46 that is configured to be secured to one of the clamping members 44 of the pipe clamp 40. The opposing end of the assembly 200 is configured to have the antenna 60 secured thereto (e.g., via the upper antenna mounting bracket 130).

As shown in FIGS. 7A-7B, the upper radio mounting bracket assembly 200 has a main body 201 and two opposing sidewalls 202 that are coupled to and extend downwardly from the main body 201. An elongated adjustment slot 205 resides within each of the sidewalls 202. In some embodiments, the sidewalls 202 of the bracket assembly 200 may comprise indicia 210 that corresponds to the degrees of the angle of tilt (α) of the base station antenna 80. The indicia 210 may assist a technician when adjusting the tilt of the mounting system 100 and corresponding base station antenna 80 to a desired angle of tilt (α). The indicia 210 may be located above and/or below the elongated slot 205. In some embodiments, the main body 201 and/or sidewalls 202 of the bracket assembly 200 may further comprise a plurality of additional apertures 203 which may help to reduce the overall weight of the assembly 200.

Still referring to FIG. 6 and FIGS. 7A-7B, the bracket assembly 200 further comprises a rack and pinion assembly 207 (i.e., rack 204 and pinion 206). The rack 204 is coupled to an outer surface of one of the sidewalls 202. The pinion 206 has a plurality of teeth 206*a* configured to engage the rack 204 and is secured the assembly 200 via a fastener 209. In some embodiments, the fastener 209 extends through the elongated slot 205 in the corresponding sidewall 202 and is secured to the extension member 46. The fastener 209 holds the pinion 206 against an outer surface of the sidewall 202 and is configured to allow the pinion 206 to rotate relative to the sidewall 202 such that the pinion 206 can travel back-and-forth along the rack 204. As described in further detail below, the rack and pinion assembly 207 is used to adjust the base station antenna 80 to a desired angle of tilt (α).

In some embodiments, an end 209*a* of the fastener 209 is configured to engage a wrench 220 which may be used by a technician to rotate the pinion 206 and adjust the angle of tilt (α). For example, the end 209*a* of the fastener 209 may be keyed to engage a hex wrench. FIG. 7A shows the bracket assembly 200 without a wrench 220 engaged with the fastener 209 of the pinion 206. FIG. 7B shows the bracket assembly 200 with a wrench 220 engaged with the fastener 209 of the pinion 206.

In some embodiments, the upper radio mounting bracket assembly 200 may further comprise a brake slider 230. The brake slider 230 is configured to engage the pinion 206 to lock the pinion 206 in position (e.g., when a desired angle of tilt (α) of the base station antenna 80 has been achieved). In some embodiments, the brake slider 230 may be secured to the extension member 46 via a respective fastener 116. The fastener 116 for the brake slider 230 extends through the same elongated adjustment slot 205 in the sidewall 202 of the assembly 200 as the fastener 209 holding the pinion 206.

Figure 8A:
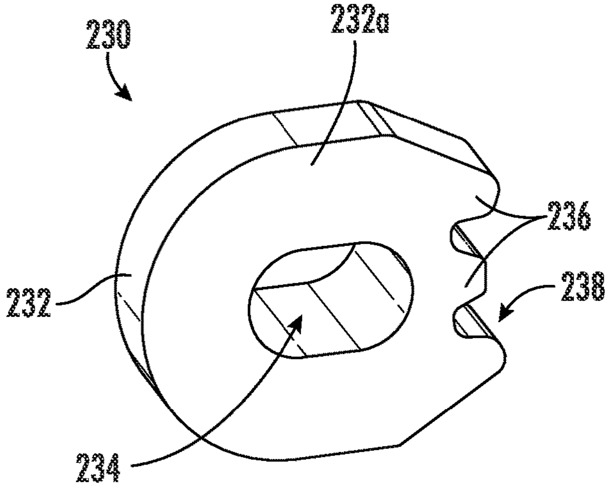
FIG. 8A is a side perspective view of a brake slider according to embodiments of the present invention.
Figure 8B:
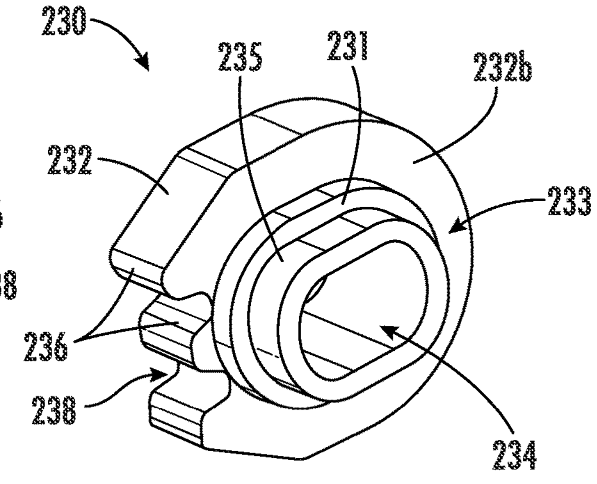
FIG. 8B is an opposing side perspective view of the brake slider of FIG. 8A.

As shown in FIGS. 8A-8B, in some embodiments, the brake slider 230 has a main body 232 having opposing sides 232*a*, 232*b*. An elliptical-shaped aperture 234 extends through the main body 232. An edge of the brake slider 230 has a plurality of protrusions 236 and recesses 238 (e.g., teeth). The teeth of the brake slider 230 are configured to engage the teeth 206*a* of the pinion 206 (see e.g., FIGS. 10A-10B). In some embodiments, one side 232*a* of the main body 232 of the brake slider 230 may be substantially planar (e.g., flat). In some embodiments, the opposing side 232*b* may have a protruding section 233 that extends outwardly therefrom. In some embodiments, the protruding section 233 has a shoulder 231.

Figure 9:
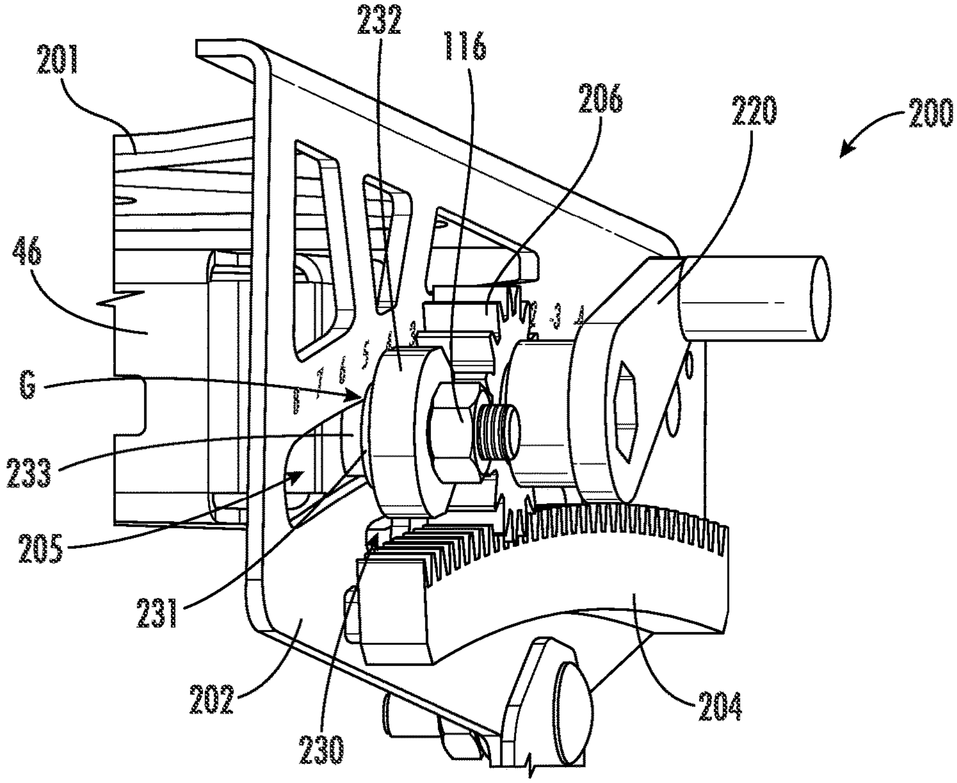
FIG. 9 is an enlarged rear perspective view of the upper radio mounting bracket assembly illustrating the brake slider of FIGS. 8A-8B received by an adjustment slot of the assembly.

As shown in FIG. 9, the protruding section 233 of the brake slider 230 is configured to be received by the elongated slot 205 of the bracket assembly 200. An outer surface 235 of the protruding section 233 is configured to slide against an inner surface of the elongated slot 205. The shoulder 231 of the protruding section 233 contacts an outer surface of the sidewall 202 of the assembly 200 creating a gap G between the main body 232 of the brake slider 230 and the sidewall 202. The gap G helps align the "teeth" of the brake slider 230 (i.e., protrusions 236 and recesses 238) with the teeth 206*a* of the pinion 206.

Figure 10A:
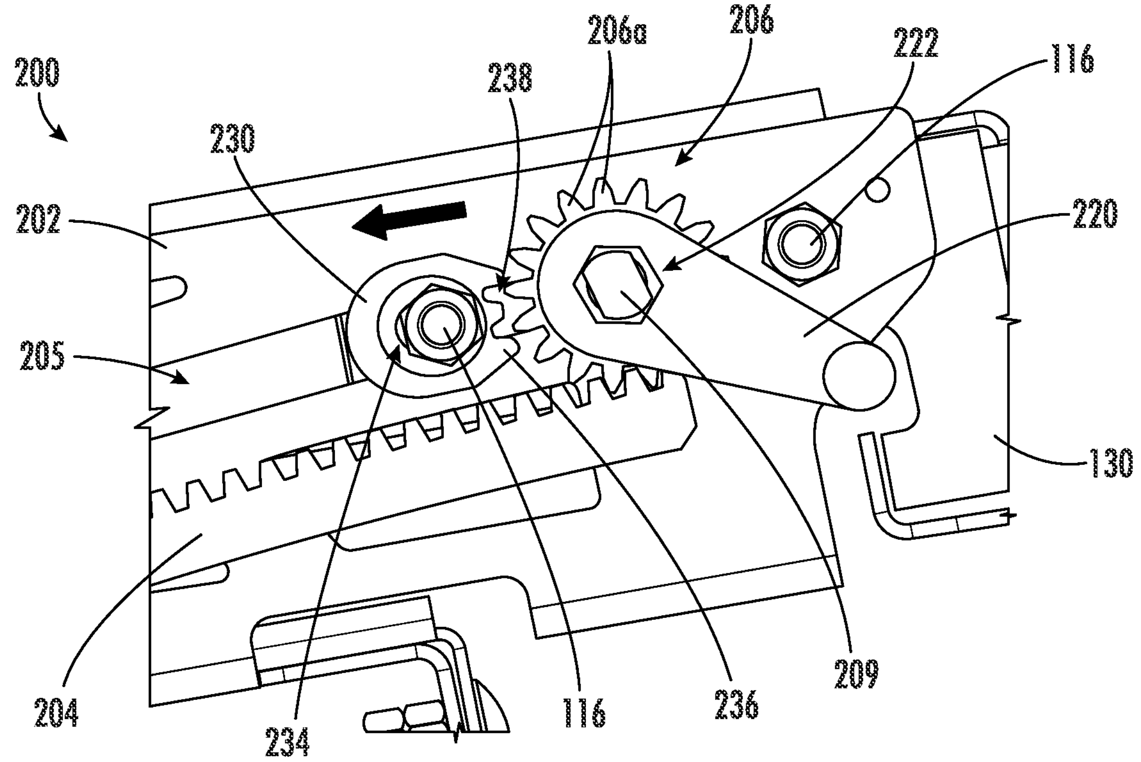
FIG. 10A is an enlarged side view of the upper radio mounting bracket assembly of FIG. 7A illustrating the brake slider of FIGS. 8A-8B disengaged from a rack and pinion assembly (i.e., in an "unlocked" position).
Figure 10B:
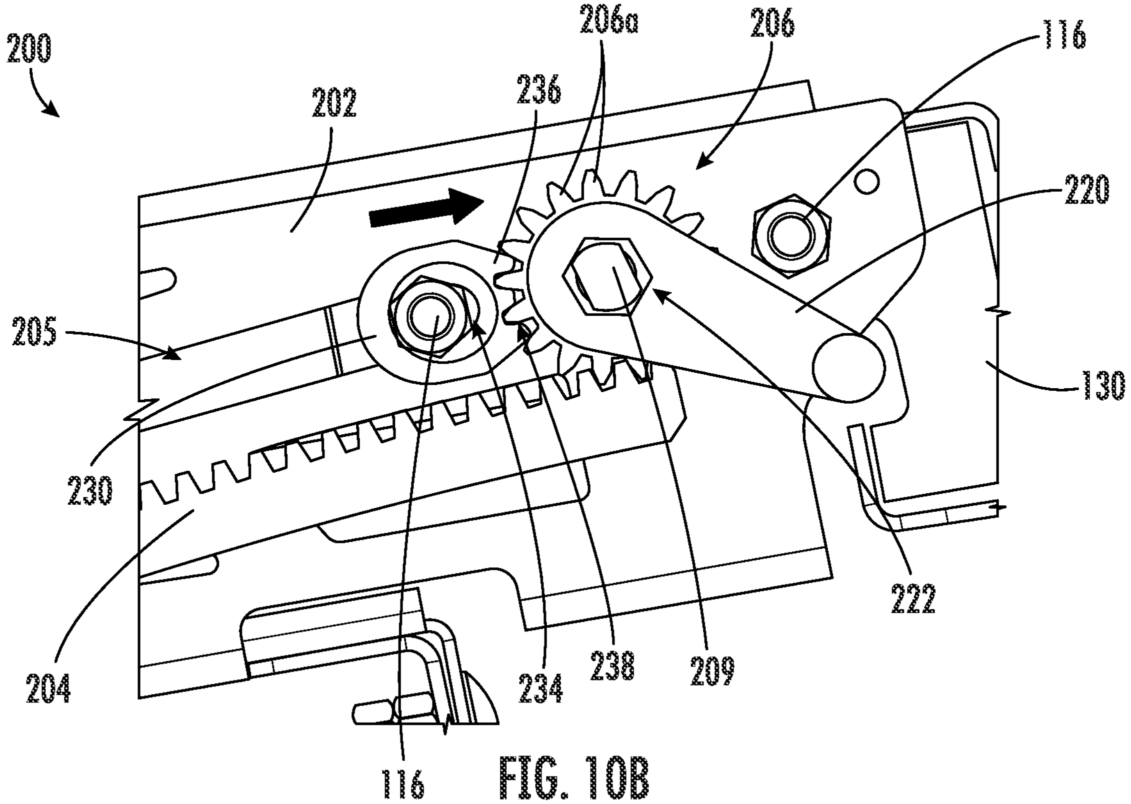
FIG. 10B is an enlarged side view of the upper radio mounting bracket assembly of FIG. 7A illustrating the brake slider of FIGS. 8A-8B engaged with the rack and pinion assembly (i.e., in a "locked" position").

As illustrated in FIGS. 10A-10B, the elliptical-shaped aperture 234 allows the brake slider 230 to slide back-and-forth relative to the fastener 116. This movement allows the brake slider 230 to engage or disengage the pinion 206. FIG. 10A shows the brake slider 230 disengaged with the pinion 206, and thus, the pinion 206 is able to rotate relative to the sidewall 202 (i.e., the brake slider 230 is in an "unlocked" position). FIG. 10B shows the brake slider 230 engaged with the pinion 206, and thus, preventing the pinion 206 from rotating relative to the sidewall 202 (i.e., the brake slider 230 is in a "locked" position).

Referring back to FIG. 6 and FIGS. 7A-7B, each sidewall 202 of the bracket assembly 200 further comprises a plurality of apertures 202*a* that are configured to receive respective fasteners 116. As shown in FIGS. 7A-7B, at least two of the apertures 202*a* are configured to receive a respective fastener 116 for pivotably mounting and securing the upper antenna mounting bracket 130 (and antenna 60 attached thereto) to the upper radio mounting bracket assembly 200. Two additional apertures 202*a* are configured to receive a respective fastener 116 for mounting and securing the upper radio mounting bracket 110 to the upper radio mounting bracket assembly 200.

In addition, each sidewall 202 further comprises an open-end slot 215 that is configured to receive another respective fastener 116 for mounting and securing the upper radio mounting bracket 110 to the bracket assembly 200. As discussed in further detail below, after a radio 60 is secured to the upper radio mounting bracket 110, the respective fasteners 116 extending through one of the apertures 114*a* in each arm member 114 of the upper radio mounting bracket 110 is configured to slide into (or out of) the respective open-end slot 215 to engage (or disengage) the mounting bracket 110 from the upper radio mounting bracket assembly 200, thereby allowing for easy installation and/or removal of the radio 60 from the assembly 100.

Referring now to FIGS. 11A-11B, the lower antenna mounting bracket assembly 400 according to embodiments of the present invention is illustrated. As shown in FIGS. 11A-11B, the lower antenna mounting bracket assembly 400 is similar to the lower radio mounting bracket assembly 300 (see, e.g., FIG. 5). The lower antenna mounting bracket assembly 400 is configured to secure a lower portion of the antenna 60 (e.g., via a lower antenna mounting bracket 140) to the mounting structure 50 (e.g., via a pipe clamp 40). As shown in FIGS. 11A-11B, in some embodiments, the lower antenna mounting bracket assembly 400 has a main body 401 and two opposing sidewalls 402 that are coupled to and extend downwardly from the main body 401. Each sidewall 402 comprises an aperture 402*a* that aligns with the corresponding apertures 140*a* in the lower antenna mounting bracket 140. The aligned apertures 402*a*, 140*a* are configured to receive a fastener 116 such that the lower antenna mounting bracket 140 may be pivotably mounted and secured the lower antenna mounting bracket assembly 400. Each sidewall 401 of the bracket assembly 400 further comprises an elongated adjustment slot 405. The elongated slot 405 is configured to receive a second fastener 116 for slidably and/or pivotably mounting and securing the bracket assembly 400 to a corresponding pipe clamp 40. The second fastener 116 is configured to slide and/or pivot within the slot 405 which allows the bracket assembly 400 to move relative to the pipe clamp 40 (and mounting structure 50) as the angle of tilt (α) of the mounting system 100 and base station antenna 80 is adjusted.

During installation, first, the antenna 60 is secured to the mounting structure 50 as described herein (i.e., via upper and lower antenna mounting brackets 130, 140 and corresponding mounting bracket assemblies 200, 350, 400 and pipe clamps 40). Next, the active antenna module or radio 70 is mounted and secured to the mounting structure 50 via mounting kit 150. To mount and secure the radio 70 to the mounting structure 50, the upper and lower radio mounting brackets 110, 120 are first secured to the radio 70 via fasteners 118. In some embodiments, the lower radio mounting bracket assembly 300 may be slid and/or pivoted toward the mounting structure 50 to provide additional space between the mounting structure 50 and the already-mounted antenna 60. Fasteners 116 are inserted into one of the apertures 114*a* in each arm member 114 of the upper radio mounting bracket 110 (which the radio 70 has already been secured). The fasteners 116 are then slid into respective open-end slots 215 of the upper radio mounting bracket assembly 200 to engage the upper radio mounting bracket 110 with the upper radio mounting bracket assembly 200. The assembly 200 is able to support the weight of the radio 70 such that a technician does not have to simultaneously hold the radio 70 while tightening the fasteners 116. The other aperture 114*a* in each arm member 114 of the upper radio mounting bracket 110 is then aligned with the corresponding apertures 202*a* in the sidewall 202 of the upper radio mounting bracket assembly 200 and additional fasteners 116 are inserted therethrough. Each of the fasteners 116 may then be tightened to secure the upper radio mounting bracket 110 (and mounted radio 70) to the upper radio mounting bracket assembly 200. The lower radio mounting bracket assembly 300 may then be slid and/or pivoted back toward the radio 70 and secured to the radio 70 via lower radio mounting bracket 120 and respective fasteners 116, thereby securing the radio 70 to the upper and lower radio mounting bracket assemblies 200, 300. Thus, all of the load weight of the active antenna module (radio) 70 is now supported by the mounting structure 50 through the upper and lower radio mounting bracket assemblies 200, 300 (i.e., mounting kit 150).

Figure 12C:
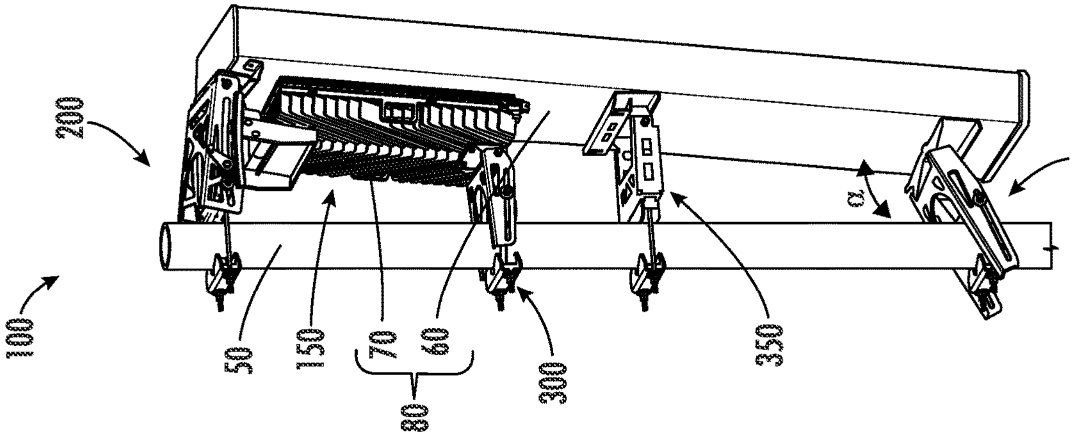
FIGS. 12A-12C illustrate exemplary tilt capabilities of the mounting system of FIG. 2 according to embodiments of the present invention.
Figure 12B:
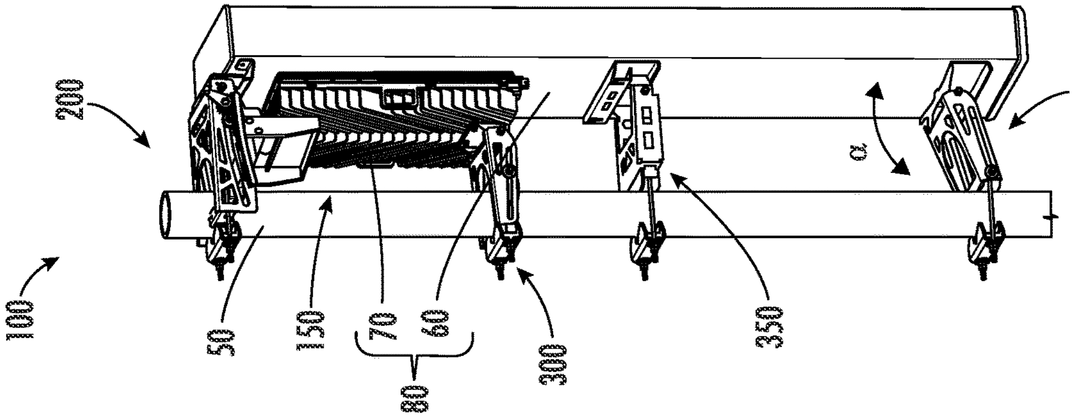
Figure 12A:
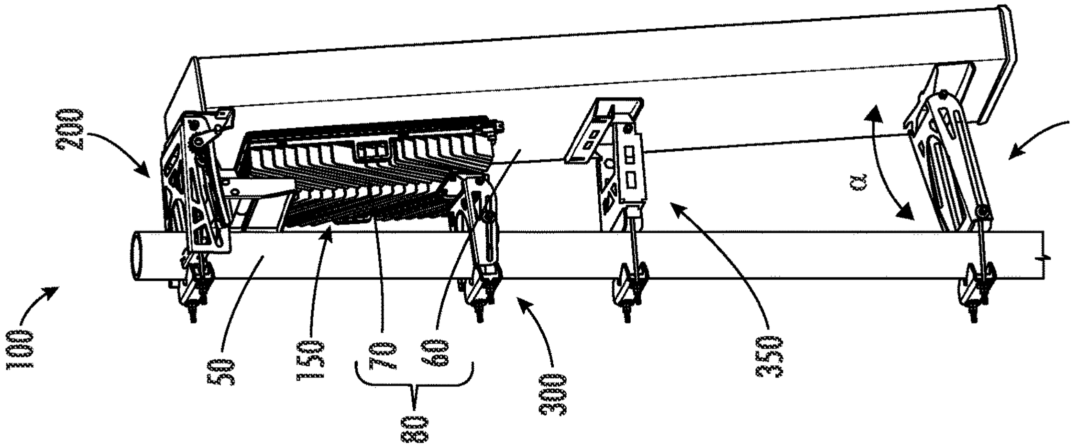

In operation, as discussed above and shown in FIGS. 12A-12C, the mounting system 100 may be configured to tilt the base station antenna 80 upwardly or downwardly to a desired angle of tilt (α). FIG. 12A shows the mounting system 100 providing an upward tilt to the base station antenna 80. FIG. 12B shows the mounting system 100 providing zero tilt to the base station antenna 80. FIG. 12C shows the mounting system 100 providing a downward tilt to the base station antenna 80.

To adjust the angle of tilt (α), a technician engages a wrench 220 (or other similar device) with the rack and pinion assembly 207 of the upper radio mounting bracket assembly 200 (e.g., engages the wrench 220 with the end 209*a* of a fastener 209 of the pinion 206) (see, e.g., FIGS. 10A-10B). The technician then moves/slides the brake slider 230 to disengage the pinion 206, thereby allowing the pinion 206 to rotate relative to the sidewall 202 of the assembly 200 and travel back-and-forth along the rack 204. The technician rotates the pinion 206 to travel a desired direction along the rack 204 which simultaneously moves the assembly 200 forwardly or rearwardly relative to the pipe clamp 40 and mounting structure 50. As the assembly 200 moves in response to the rotation of the pinion 206, the antenna 60 is configured to pivot about the middle antenna mounting bracket 350. In addition, the lower antenna mounting bracket assembly 400 slides/pivots in the opposite direction as the movement of the upper radio mounting bracket assembly 200.

For example, in some embodiments, rotation of the pinion 206 in a clockwise direction may move the assembly 200 rearwardly relative to the mounting structure 50 which forces the upper radio mounting bracket assembly 200 to pull the upper portion of the base station antenna 80 in a direction toward the mounting structure 50. In response, the lower antenna mounting bracket assembly 400 allows the lower portion of the antenna 60 to move in a direction away the mounting structure 50, thereby providing uptilt to the base station antenna 80 (see, e.g., FIG. 12A). In some embodiments, rotation of the pinion 206 in a counterclockwise direction may move the assembly 200 forwardly relative to the mounting structure 50 which forces the upper radio mounting bracket assembly 200 to push an upper portion of the base station antenna 80 in a direction away from the mounting structure 50. In response, the lower antenna mounting bracket assembly 400 allows a lower portion of the antenna 60 to move in a direction toward the mounting structure 50, thereby providing downtilt to the base station antenna (see, e.g., FIG. 12C). Using indicia 210 on the sidewall 202 of the upper radio mounting bracket assembly 200, the technician rotates the pinion 206 clockwise or counterclockwise until a desired angle of tilt (α) for the base station antenna 80 is reached. The brake slider 230 may then be moved or slid to engage the pinion 206, thereby locking the mounting system 100 and base station antenna 80 at the desired angle of tilt (α).

Referring now to FIGS. 13A-16C, an alternative mounting system 500 according to embodiments of the present invention is illustrated. Properties and/or features of the mounting system 500 may be as described above in reference to the mounting system 100 shown in FIGS. 2-12C and duplicate discussion thereof may be omitted herein for the purposes of discussing FIGS. 13A-16C. The mounting system 500 differs from mounting system 100 in that the mounting system 500 includes an alternative mounting kit 550 and modified upper radio mounting bracket assembly 600 to accommodate the alternative mounting kit 550. In particular, the mounting kit 550 includes an alternative upper radio mounting bracket 510 and method of securing the upper radio mounting bracket 510 to the upper radio mounting bracket assembly 600.

Figure 13A:
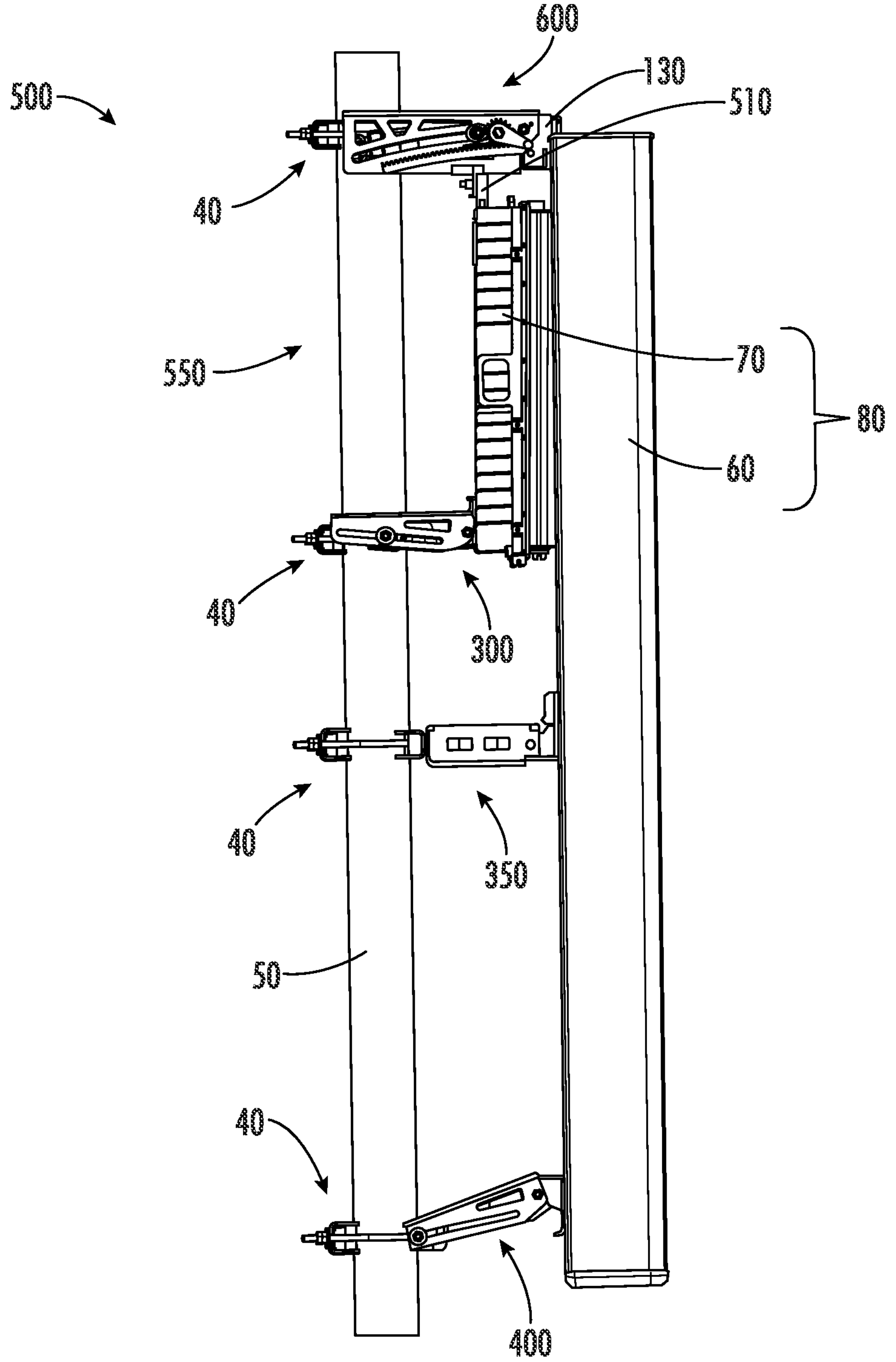
FIG. 13A is a side view of a mounting system for a base station antenna having an alternative mounting kit according to embodiments of the present invention.
Figure 13B:
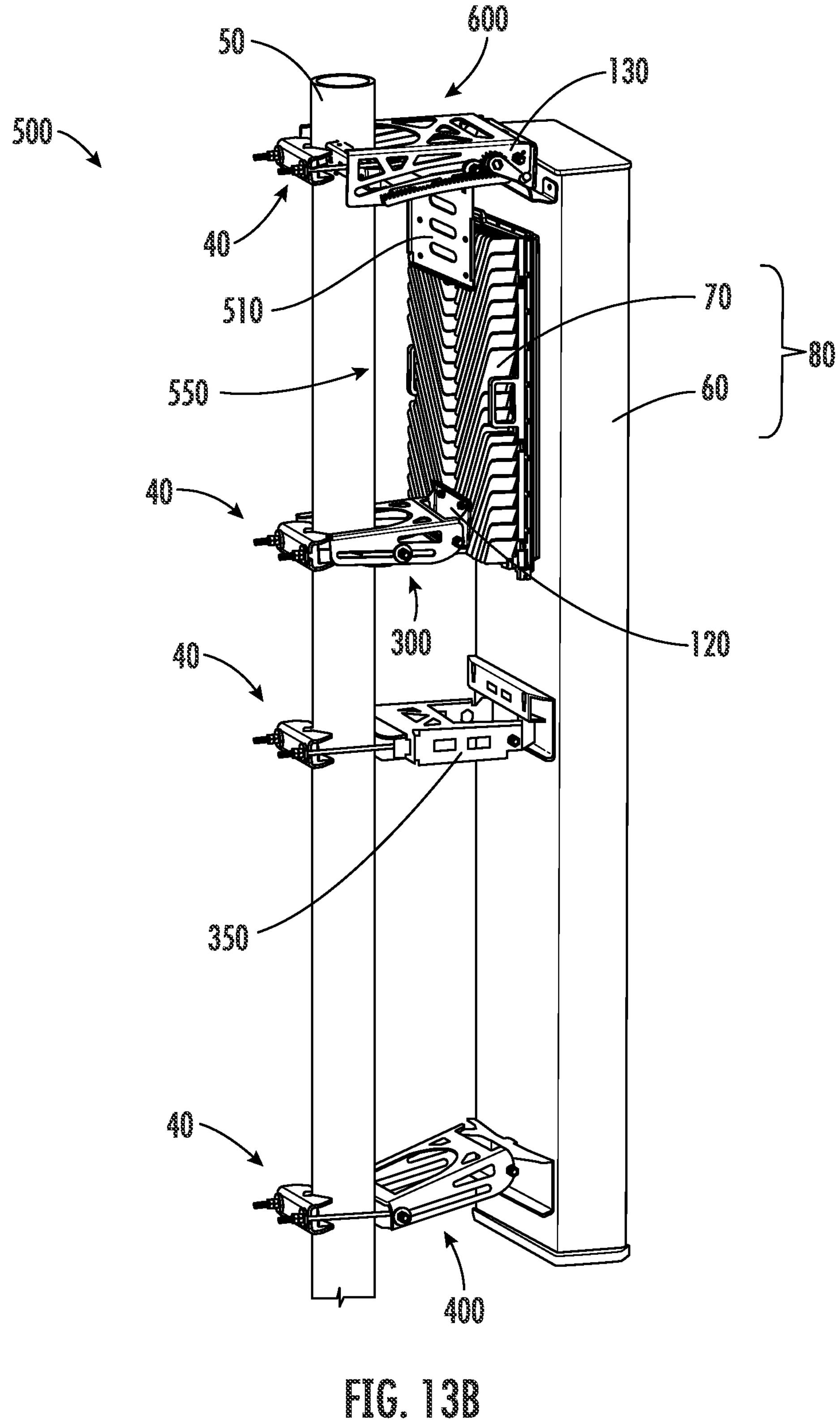
FIG. 13B is a rear perspective view of the mounting system of FIG. 13A.

As shown in FIGS. 13A-13B, similar to the mounting kit 150 of the mounting system 100 described herein, in some embodiments, the mounting kit 550 of the mounting system 500 includes an upper radio mounting bracket assembly 600 and a lower radio mounting bracket assembly 300. In some embodiments, the mounting system 500 further includes a middle antenna mounting bracket assembly 350 and a lower antenna mounting bracket assembly 400. Standard pipe clamps 40 may be used to mount and secure the respective bracket assemblies 300, 350, 400, 600 of the mounting system 500 to the mounting structure 50. The lower radio mounting bracket assembly 300, middle antenna mounting bracket assembly 350, and lower antenna mounting bracket assembly 400 are the same or similar to the mounting bracket assemblies described herein with respect to the mounting system 100, and thus, will not be described in further detail again.

Figure 14C:
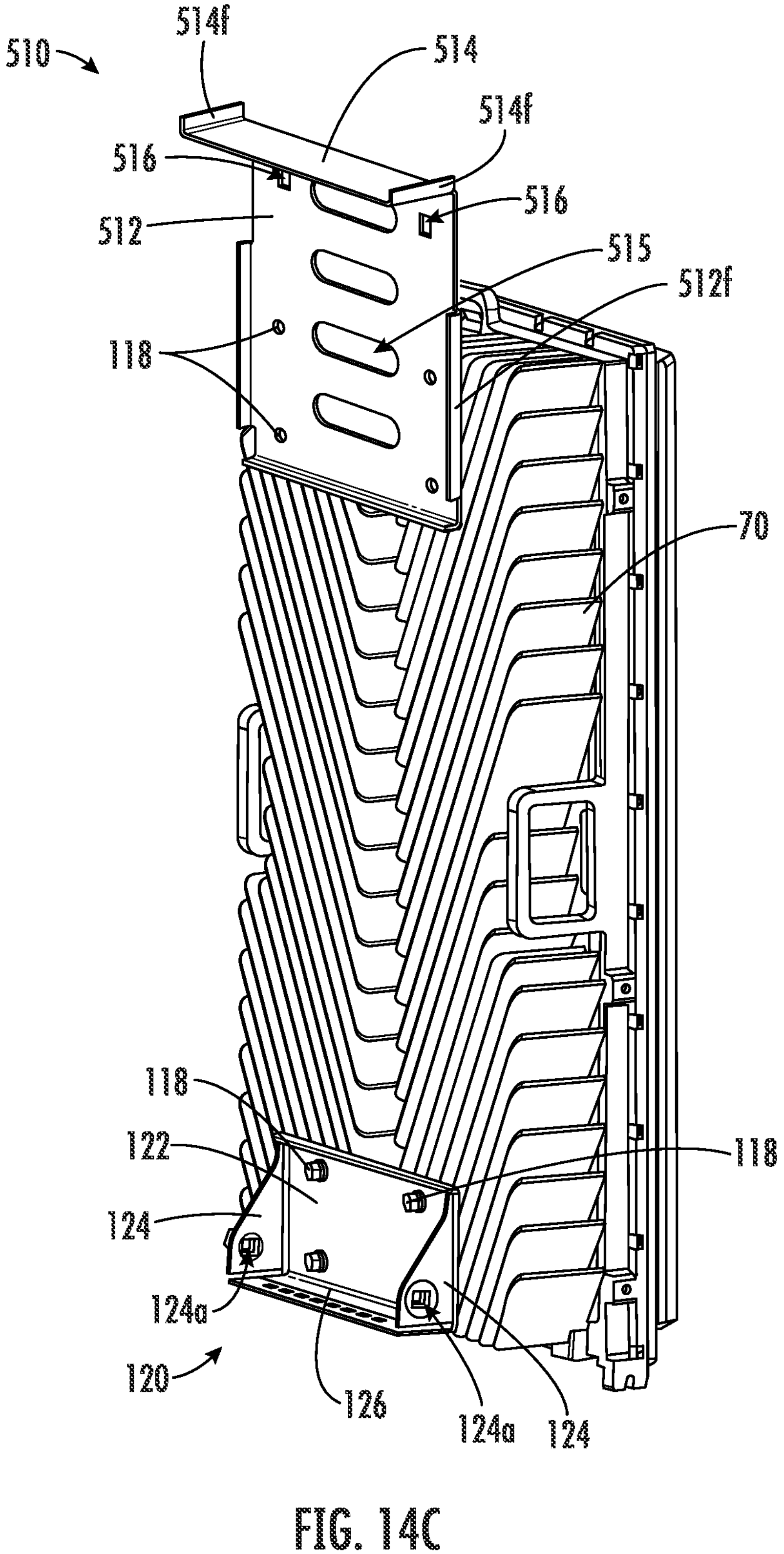
FIG. 14C is a rear perspective view of the upper and lower mounting brackets of FIGS. 14A-14B secured to an active antenna module according to embodiments of the present invention.

Referring to FIGS. 14A-14C, the upper and lower radio mounting brackets 510, 120 for the mounting kit 550 are illustrated. As shown in FIG. 14B, the lower radio mounting bracket 120 is the same or similar to the lower radio mounting bracket 120 described herein with respect to mounting kit 150. However, as shown in FIG. 14A, the upper radio mounting bracket 510 is different than the upper radio mounting bracket 110 for mounting kit 150 (see e.g., FIG. 4).

The upper radio mounting bracket 510 has a main body 512. A top end 514 of the main body 512 extends outwardly from, and perpendicular to, the main body 512 to form an L-shaped profile. The main body 512 comprises a plurality of apertures 515, 516, 518. In some embodiments, some of the apertures 516, 518 are configured to receive respective fasteners 116, 118. For example, apertures 518 are configured to align with corresponding apertures (not shown) in the radio 70 to secure the bracket 510 to the radio 70 (e.g., via fasteners 118) (see, e.g., FIG. 14C). Apertures 516 are configured to align with corresponding apertures 613*a* in the upper radio mounting bracket assembly 600 to secure the bracket 510 (and radio 70) to the assembly 600 (see, e.g., FIG. 15A). In some embodiments, other apertures 515 in the main body 512 may help to reduce the overall weight of the mounting kit 550. In addition, in some embodiments, the bracket 510 may further comprise one or more flanged edges 512*f*, 514*f*. The one or more flanged edges 512*f*, 514*f* may help to increase the strength of the bracket 510.

Figure 15A:
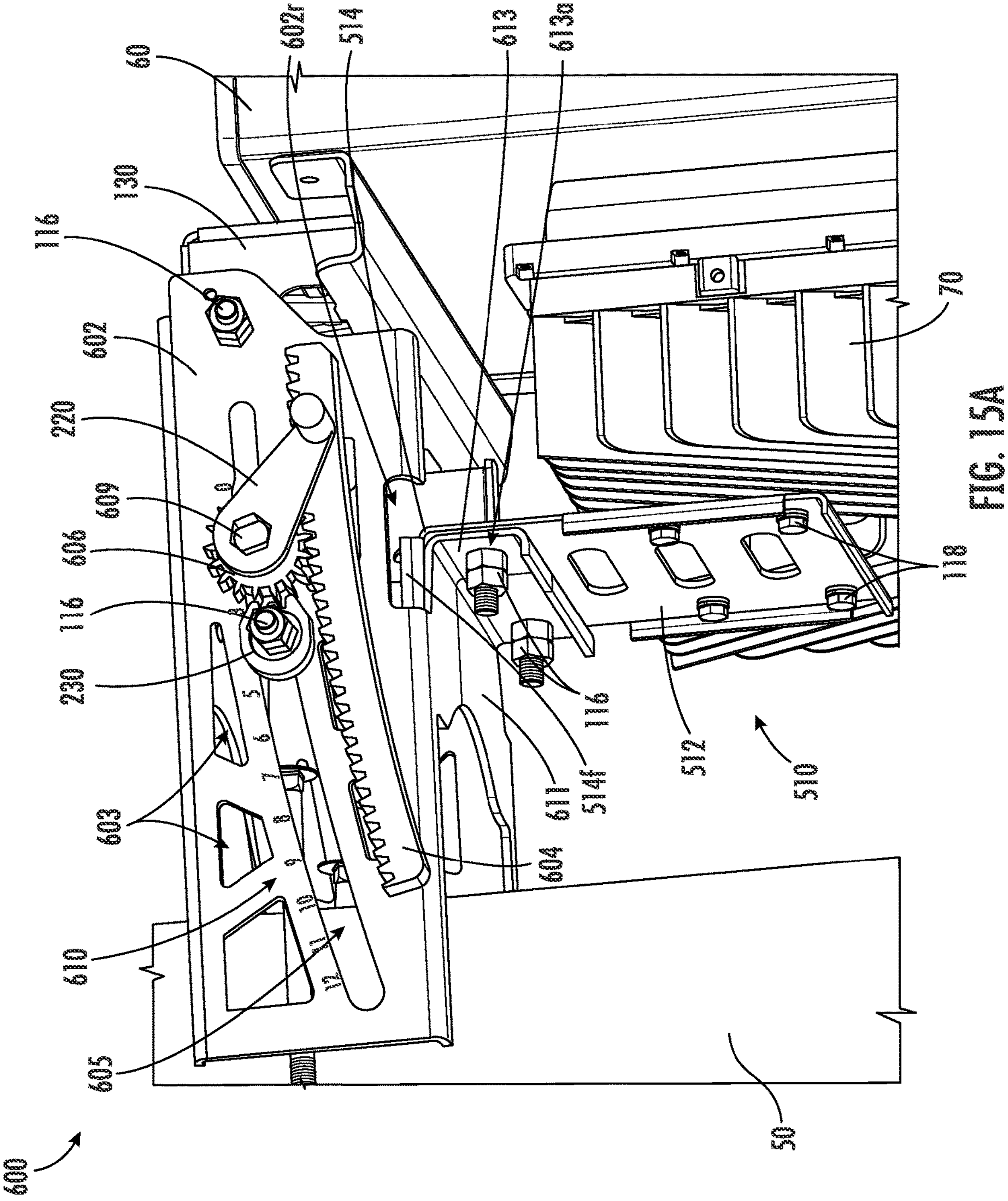
FIG. 15A is an enlarged bottom perspective view of the upper radio mounting bracket assembly and upper radio mounting bracket of the assembly of FIG. 13A.
Figure 15B:
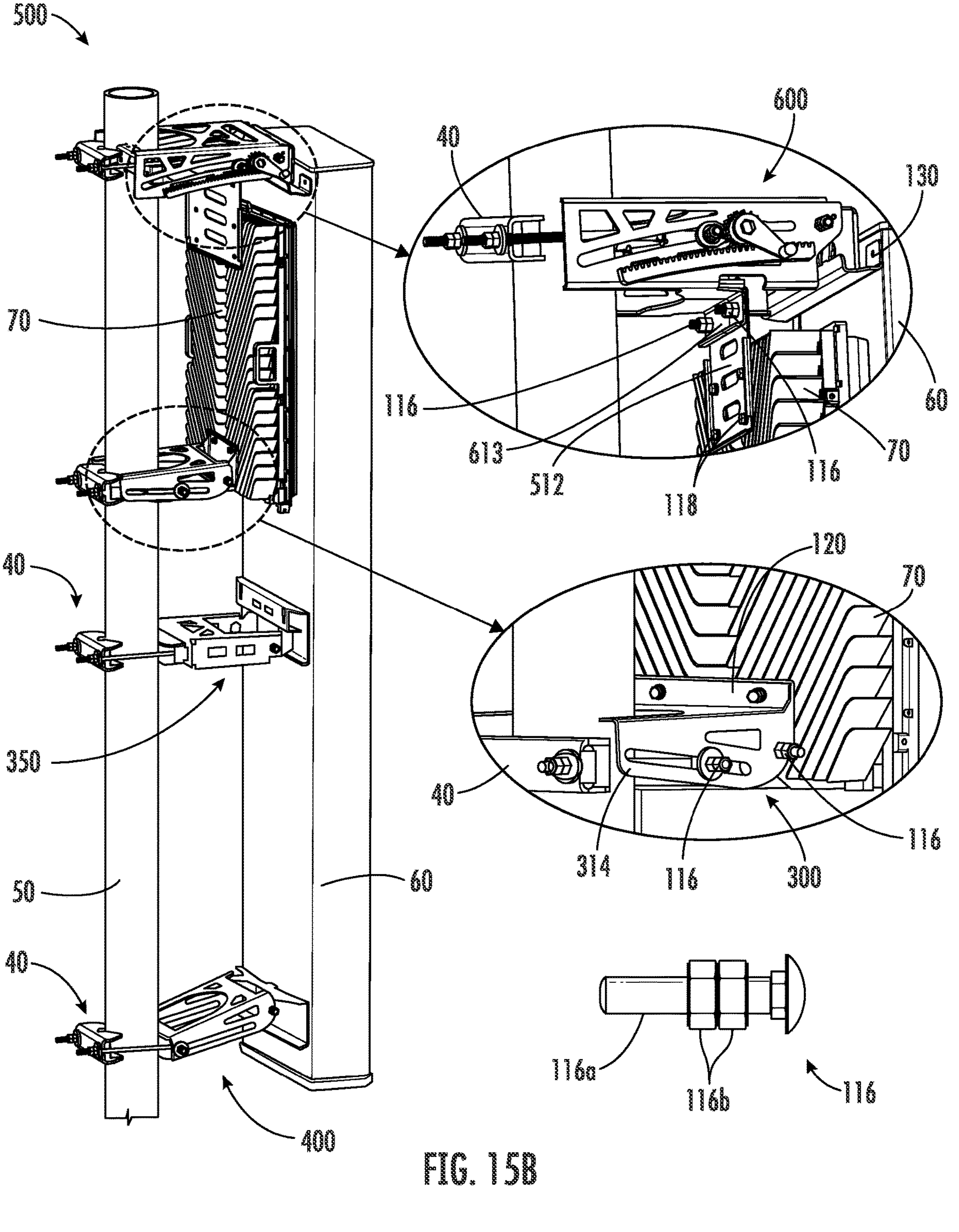
FIG. 15B is a rear perspective of the mounting system of FIG. 13A illustrating the installed base station antenna with enlarged views of the upper and lower radio mounting bracket assemblies and an exemplary fastener that may be used with all of mounting bracket assemblies.

FIGS. 15A-15B further illustrate the alternative mounting system 500 according to embodiments of the present invention. FIG. 15A illustrates the upper radio mounting bracket 510 mounted and secured to the upper radio mounting bracket assembly 600. FIG. 15B illustrates the entire mounting system 500 with enlarged views of the upper radio mounting bracket 510 secured to the upper radio mounting bracket assembly 600 and the lower radio mounting bracket 120 secured to the lower radio mounting bracket assembly 300. FIG. 15B also illustrates an exemplary fastener 116 (e.g., bolt 116*a* and nuts 116*b*) that may be used as described herein.

As shown in FIG. 15A, according to embodiments of the present invention, the upper radio mounting bracket assembly 600 has been modified (when compared to upper radio mounting bracket assembly 200 described herein) to accommodate the alternative upper radio mounting bracket 510. In particular, the upper radio mounting bracket assembly 600 includes a bottom plate member 611 coupled to, and extending between, a bottom edge of each opposing sidewall 602. In some embodiments, the bottom plate member 611 comprises a flanged or bent section 613 extending outwardly (and downwardly) from the bottom plate member 611. The flanged or bent section 613 includes a pair of apertures 613*a* configured to receive respective fasteners 116. As discussed above, the apertures 613*a* in the flanged section 613 are configured to align with corresponding apertures 516 in the upper radio mounting bracket 510 to mount and secure the upper radio mounting bracket 510 to the upper radio mounting bracket assembly 600 (i.e., via fasteners 116). In some embodiments, each sidewall 602 further comprises a recess 602*r*. As described in further detail below, the recesses 602*r* in the respective sidewalls 602 are configured to receive the top end 514 of the upper radio mounting bracket 510 such that the top end 514 of the bracket 510 can engage (e.g., rest on top of) and be supported by the bottom plate member 611 of the upper radio bracket assembly 600.

Figure 16A:
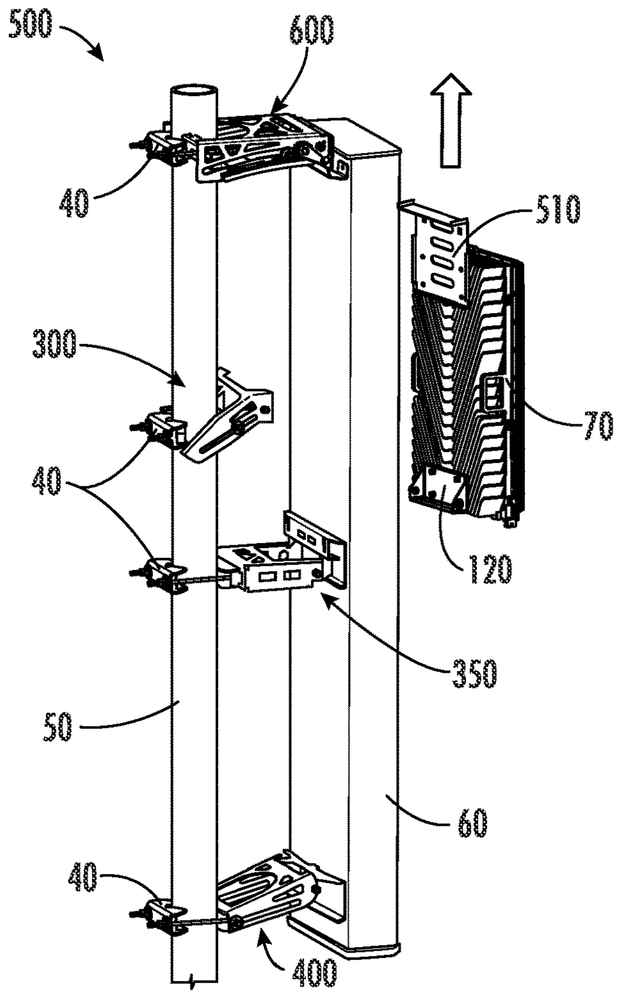
FIG. 16A-16B illustrate installation of an active antenna module utilizing the alternative mounting kit within the mounting system of FIG. 13A according to embodiments of the present invention.
Figure 16B:
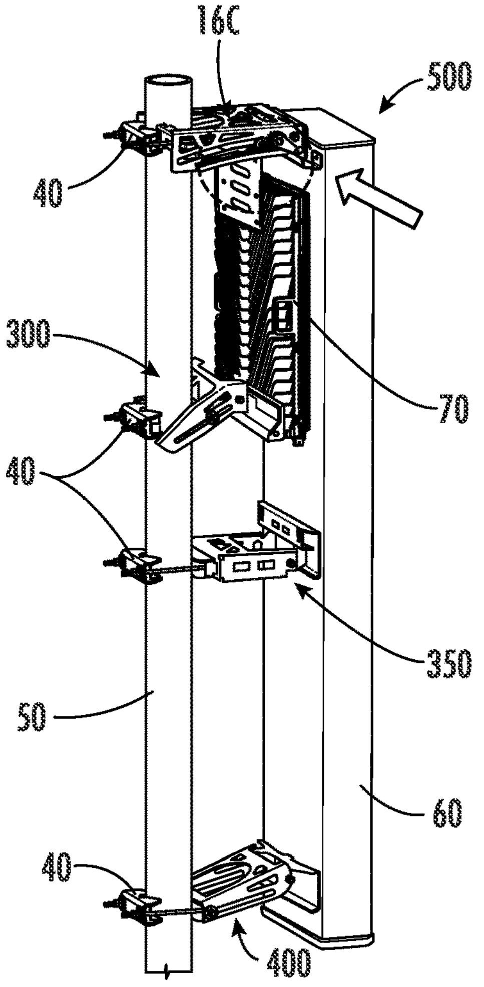
Figure 16C:
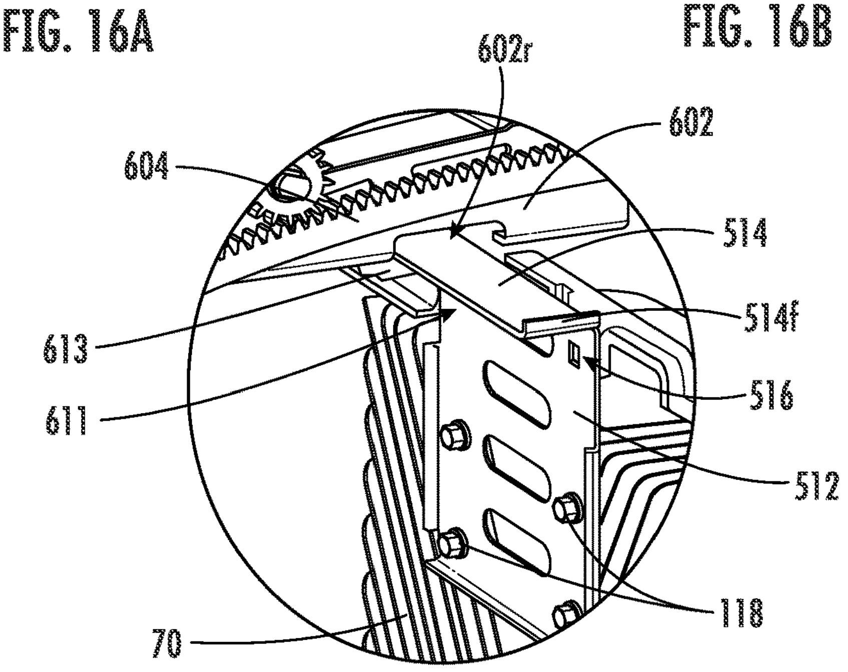
FIG. 16C is an enlarged view of the section labelled "16C" in FIG. 16B illustrating the upper radio mounting bracket of the alternative mounting kit being slid onto the upper radio mounting bracket assembly according to embodiments of the present invention.

As shown in FIGS. 16A-16C, during installation, first, the antenna 60 is secured to the mounting structure 50 as described herein (i.e., via upper and lower antenna mounting brackets 130, 140 and corresponding mounting bracket assemblies 600, 350, 400 and pipe clamps 40). Next, as shown in FIG. 16A, the active antenna module or radio 70 is mounted and secured to the mounting structure 50 (and upper radio mounting bracket assembly 600) via mounting kit 550. To mount and secure the radio 70, the upper and lower radio mounting brackets 510, 120 are first secured to the radio 70 via fasteners 118. In some embodiments, the lower radio mounting bracket assembly 300 may be slid and/or pivoted toward the mounting structure 50 to provide additional space between the mounting structure 50 and the already-mounted antenna 60.

As shown in FIGS. 16B-16C, the top end 514 of the mounting bracket 510 (with radio 70 attached thereto) is slid through the recess 602*r* in one of the sidewalls 602 of the assembly 600 and positioned to rest (or sit) the top end 514 of the bracket 510 on the bottom plate member 611. The bottom plate member 611 is configured to support the weight of the radio 70 such that a technician does not have to simultaneously hold the radio 70 while tightening the fasteners 116. This allows the technician to insert the fasteners 116 through the aligned apertures 516, 613*a* of the upper radio mounting bracket 510 and flanged or bent section 613 of the bottom plate member 611. The fasteners 116 may then be tightened to secure the bracket 510 (and mounted radio 70) to the upper radio mounting bracket assembly 600. The lower radio mounting bracket assembly 300 may then be slid and/or pivoted back toward the radio 70 and secured to the radio 70 via lower radio mounting bracket 120 and respective fasteners 116, thereby securing the radio 70 to the upper and lower radio mounting bracket assemblies 200, 300. Thus, all of the load weight of the active antenna module (radio) 70 is now supported by the mounting structure 50 through the upper and lower radio mounting bracket assemblies 200, 300 (i.e., mounting kit 150) (see, e.g., FIG. 15B).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A mounting system for a base station antenna, the system comprising:

a passive antenna and an active antenna module;

a mounting kit comprising an upper radio mounting bracket assembly and a lower radio mounting bracket assembly, the mounting kit being configured to mount and secure an upper portion of the passive antenna to a mounting structure and mount and secure the active antenna module to the mounting structure behind the passive antenna;

a middle antenna mounting bracket assembly configured to pivotably mount a middle portion of the passive antenna to the mounting structure; and a lower antenna mounting bracket assembly configured to slidably and/or pivotably mount a lower portion of the passive antenna to the mounting structure, wherein the mounting system is configured to adjust the base station antenna downwardly or upwardly to a desired angle of tilt, wherein the mounting kit further comprises an upper radio mounting bracket and a lower radio mounting bracket, the upper radio mounting bracket being configured to detachably mount the active antenna module to the upper radio mounting bracket assembly and the lower radio mounting bracket being configured to detachably mount the active antenna module to the lower radio mounting bracket assembly.

2. The mounting system of claim 1, wherein the upper and lower radio mounting bracket assemblies and the middle and lower antenna mounting bracket assemblies are each secured to the mounting structure by a respective pipe clamp.

3. The mounting system of claim 2, further comprising an extension member coupled to the upper radio mounting bracket assembly and configured to be secured to a clamping member of the respective pipe clamp.

4. The mounting system of claim 1, further comprising an upper antenna mounting bracket configured to mount and secure the passive antenna to the upper radio mounting bracket assembly.

5. The mounting system of claim 1, wherein the upper radio mounting bracket assembly comprises:

a main body;

two opposing side walls that are coupled to and extend downwardly from the main body;

an elongated slot residing within each of the sidewalls; and a rack and pinion assembly coupled to one of the sidewalls, wherein the pinion is secured by a fastener extending through the elongated slot and configured to rotate relative to the sidewall such that the pinion can travel back-and-forth along the rack as the fastener slides within the elongated slot to adjust the base station antenna to the desired angle of tilt.

6. The mounting system of claim 1, wherein the lower radio mounting bracket assembly comprises a main body and two opposing sidewalls that are coupled to and extend downwardly from the main body, each sidewall comprises an elongated slot configured to receive a fastener for mounting and securing the lower radio mounting bracket assembly to a corresponding pipe clamp, wherein the fastener is configured to slide within the elongated adjustment slot when the angle of tilt for the base station antenna is adjusted.

7. The mounting system of claim 1, wherein the mounting system is configured to tilt the base station antenna at an angle of tilt in a range of about −4 degrees to about +8 degrees.

8. A mounting kit for a base station antenna, the kit comprising:

an upper radio mounting bracket assembly, the upper bracket assembly comprising:

a main body having two opposing side walls that are coupled to and extend downwardly therefrom;

a first elongated slot residing within each of the sidewalls;

a rack and pinion assembly coupled to one of the sidewalls, wherein the pinion is secured by a first fastener extending through the first elongated slot and configured to rotate relative to the sidewall such that the pinion can travel back-and-forth along the rack as the first fastener slides within the elongated slot to adjust the base station antenna to the desired angle of tilt; and a brake slider configured to engage the pinion to lock the rack and pinion assembly in position after the desired angle of tilt has been achieved; and a lower radio mounting bracket assembly, the lower bracket assembly comprising:

a main body having two opposing sidewalls that are coupled to and extend downwardly therefrom; and a second elongated slot configured to receive a second fastener for mounting and securing the lower radio mounting bracket assembly to a corresponding pipe clamp, wherein the second fastener is configured to slide within the second elongated slot as the angle of tilt for the base station antenna is being adjusted.

9. The mounting kit of claim 8, further comprising an upper radio mounting bracket and a lower radio mounting bracket, the upper radio mounting bracket being configured to detachably mount an active antenna module to the upper radio mounting bracket assembly and the lower radio mounting bracket being configured to detachably mount the active antenna module to the lower radio mounting bracket assembly.

10. The mounting kit of claim 8, wherein an end of the first fastener is configured to engage a wrench to rotate the pinion.

11. The mounting kit of claim 8, wherein the upper radio mounting bracket assembly further comprises indicia located above and/or below the first elongated slot, wherein the indicia corresponds to the degrees of the angle of tilt of the base station antenna.

12. The mounting kit of claim 8, wherein the brake slider comprises a plurality of teeth configured to engage corresponding teeth of the pinion to lock the rack and pinion assembly in position.

13. The mounting kit of claim 8, wherein the brake slider comprises an elliptical-shaped aperture and is secured by a fourth fastener extending through the elliptical-shaped aperture and first elongated slot in the sidewall of the upper radio mounting bracket assembly, wherein the fourth fastener is configured to slide within the elliptical-shaped aperture and allows the brake slider to slide back-and-forth relative to the fourth fastener to engage or disengage the pinion.

14. A mounting bracket assembly for a base station antenna, the assembly comprising:

a main body having two opposing sidewalls that are coupled to and extend downwardly therefrom;

an elongated slot residing within each of the sidewalls;

a rack and pinion assembly coupled to one of the sidewalls, wherein the pinion is secured by a fastener extending through the elongated slot and configured to rotate relative to the sidewall such that the pinion can travel back-and-forth along the rack as the fastener slides within the elongated slot to adjust the base station antenna to a desired angle of tilt; and a brake slider configured to engage the pinion to lock the rack and pinion assembly in position after the desired angle of tilt for the base station antenna has been achieved.

15. The mounting bracket assembly of claim 14, wherein each sidewall comprises an open-end slot configured to slidably receive a fastener coupled an upper radio mounting bracket for an active antenna module to mount and secure the upper radio mounting bracket to the upper radio mounting bracket assembly.

16. The mounting bracket assembly of claim 14, further comprising a bottom plate member coupled to and extending between the opposing sidewalls, wherein the bottom plate member is configured to engage a top end of an upper radio mounting bracket for an active antenna module to mount and secure the upper radio mounting bracket to the upper radio mounting bracket assembly.

17. The mounting bracket assembly of claim 14, further comprising indicia located above and/or below the elongated slot, wherein the indicia corresponds to the degrees of the angle of tilt of the base station antenna.

18. The mounting bracket assembly of claim 14, wherein the brake slider comprises a plurality of teeth configured to engage corresponding teeth of the pinion to lock the rack and pinion assembly in position.

19. The mounting bracket assembly of claim 14, wherein the brake slider comprises an elliptical-shaped aperture and is secured by a fourth fastener extending through the elliptical-shaped aperture and elongated slot in the sidewall of the upper radio mounting bracket assembly, wherein the fourth fastener is configured to slide within the elliptical-shaped aperture and allows the brake slider to slide back-and-forth relative to the fourth fastener to engage or disengage the pinion.

* * * * *